(12) United States Patent
Arai

(10) Patent No.: US 7,486,414 B2
(45) Date of Patent: Feb. 3, 2009

(54) IMAGE FORMING DEVICE, PATTERN FORMATION METHOD AND STORAGE MEDIUM STORING ITS PROGRAM

(75) Inventor: Yasuhiro Arai, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1085 days.

(21) Appl. No.: 10/890,128

(22) Filed: Jul. 14, 2004

(65) Prior Publication Data

US 2005/0219564 A1   Oct. 6, 2005

(30) Foreign Application Priority Data

Dec. 2, 2003   (JP)   ............................... 2003-402637

(51) Int. Cl.
- *H04N 1/56* (2006.01)
- *H04N 1/46* (2006.01)
- *G06K 9/34* (2006.01)

(52) U.S. Cl. .................. 358/1.9; 358/504; 358/515; 358/518; 382/162; 382/167; 382/173

(58) Field of Classification Search ................. 358/518, 358/1.2, 1.18, 1.9, 1.1, 3.31, 504, 515; 101/211, 101/483; 347/251, 240; 382/162, 167, 173
See application file for complete search history.

(56) References Cited

U.S. PATENT DOCUMENTS

| 5,953,990 A * | 9/1999 | Chalmers et al. ............. 101/211 |
| 6,278,477 B1 * | 8/2001 | Ohba ......................... 347/251 |
| 6,388,768 B2 | 5/2002 | Hada et al. |
| 2001/0017700 A1 * | 8/2001 | Homma ..................... 358/1.1 |
| 2003/0164955 A1 * | 9/2003 | Vinas et al. .................. 358/1.2 |
| 2004/0061884 A1 * | 4/2004 | Yamaguchi ................. 358/1.9 |
| 2005/0128525 A1 * | 6/2005 | Schutte, III ................ 358/3.31 |

FOREIGN PATENT DOCUMENTS

| JP | A 10-224653 | 8/1998 |
| JP | B2 3150305 | 1/2001 |

* cited by examiner

*Primary Examiner*—Edward L Coles
*Assistant Examiner*—Charlotte M Baker
(74) *Attorney, Agent, or Firm*—Oliff & Berridge, PLC

(57) ABSTRACT

An image forming device for implementing satisfactory color calibration includes a color calibration pattern generating unit that generates a color calibration pattern in a form according to an area where it is to be formed, and a visualizing unit that visualizes the color calibration pattern generated by the color calibration pattern generating unit.

8 Claims, 13 Drawing Sheets

F I G. 4
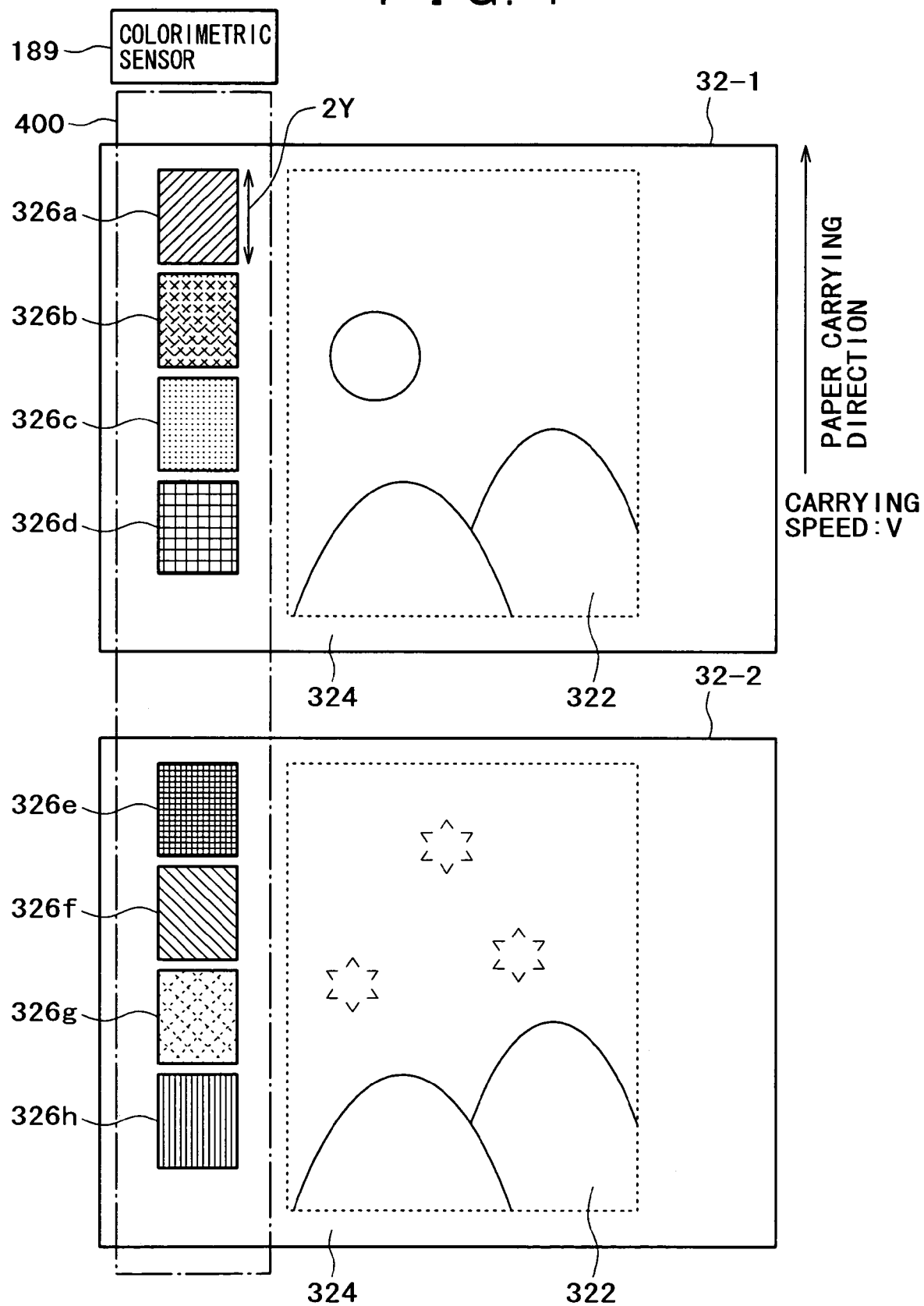

F I G. 6
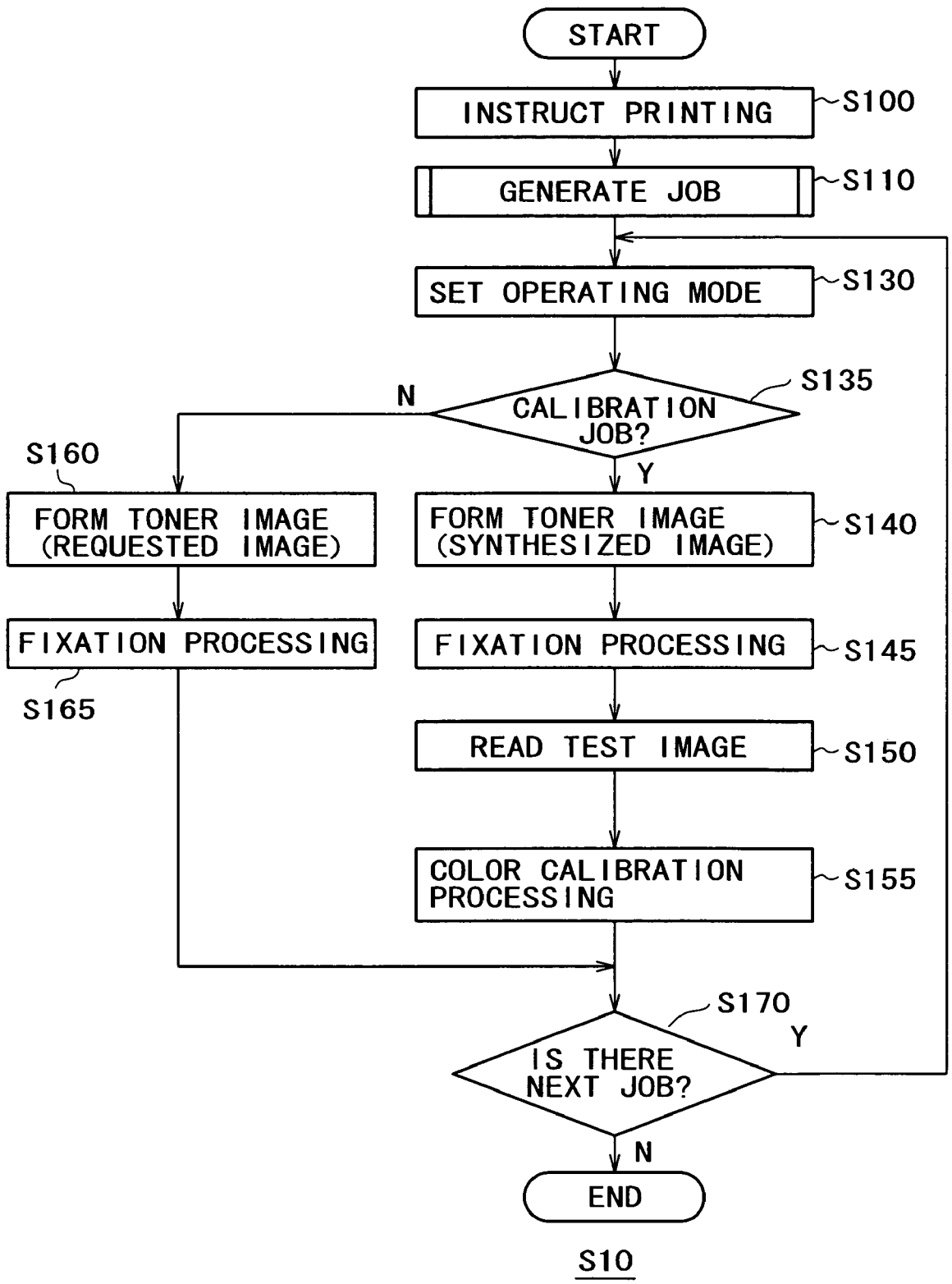

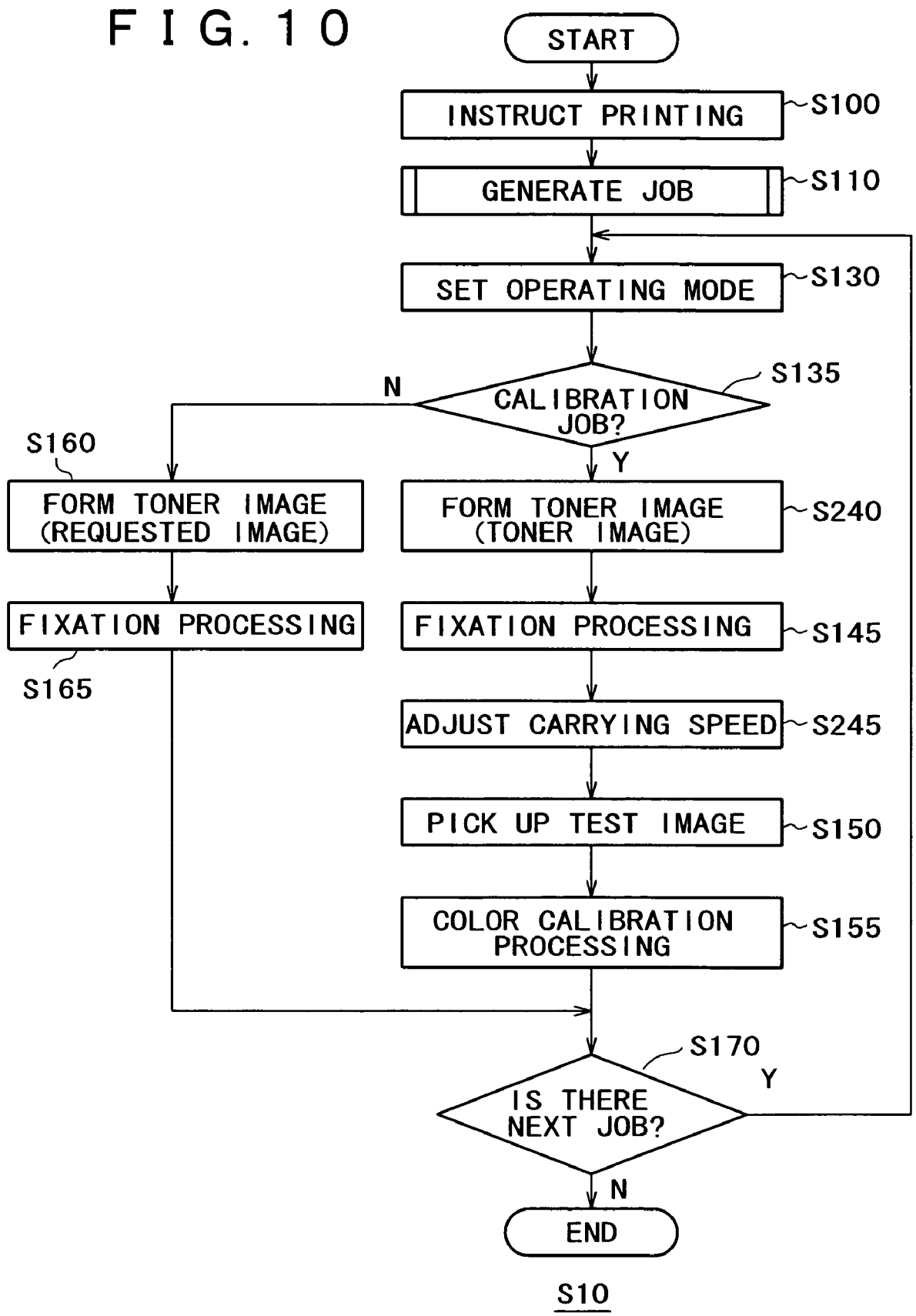

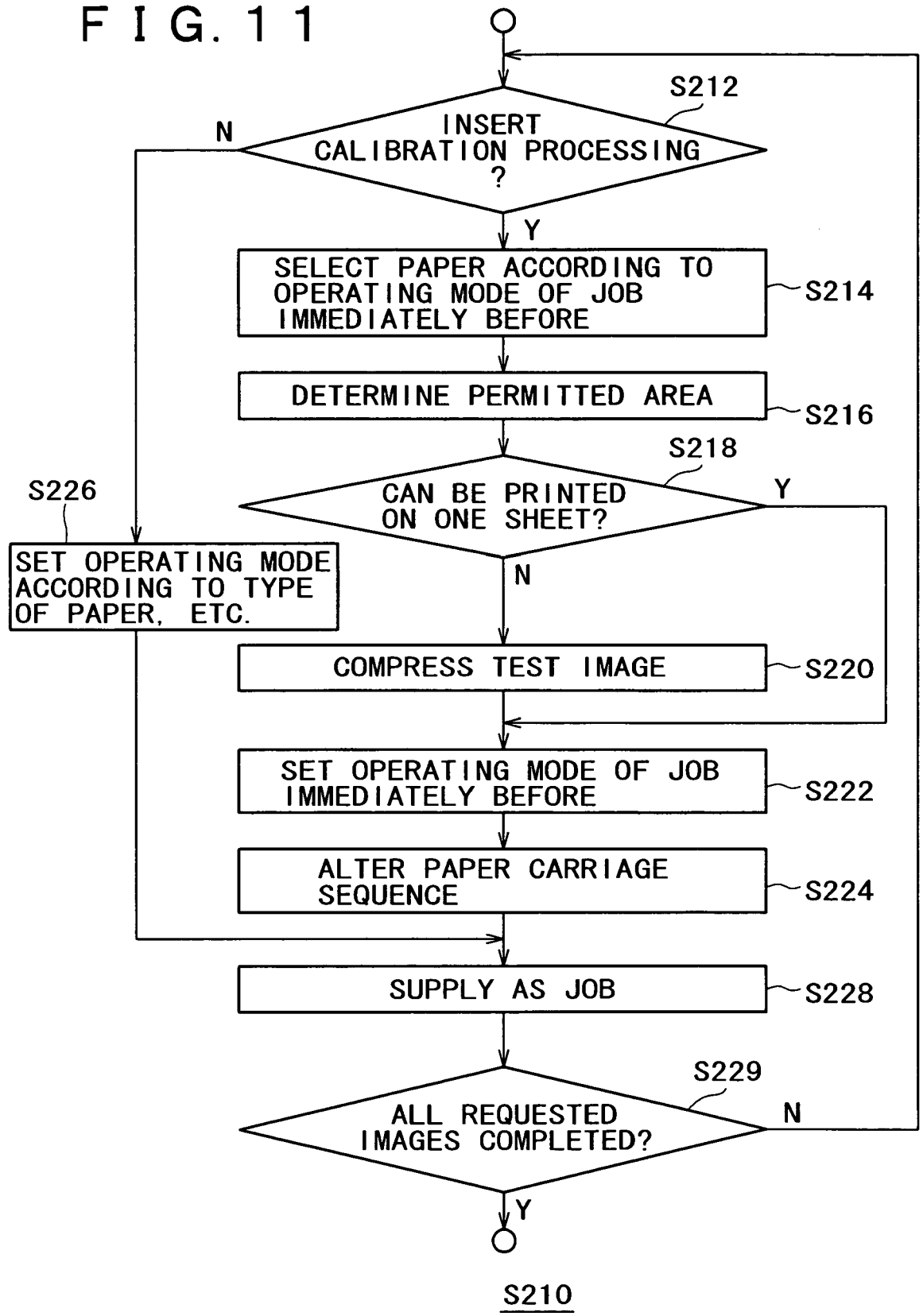

F I G. 1 2
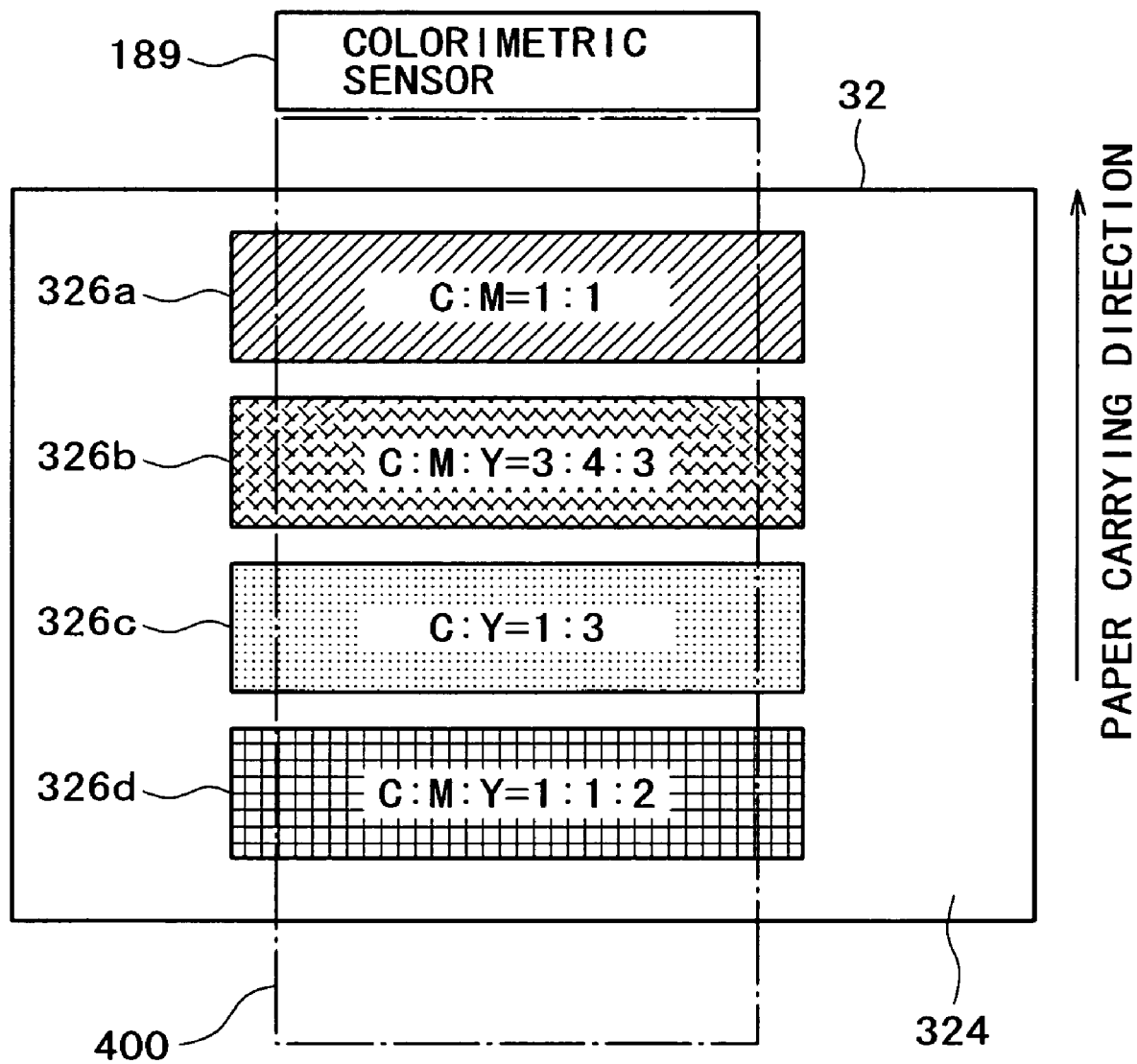

IMAGE FORMING DEVICE, PATTERN FORMATION METHOD AND STORAGE MEDIUM STORING ITS PROGRAM

BACKGROUND OF THE INVENTION

1. Field of the Invention

The present invention relates to an image forming device that supplies test images for color calibration.

2. Description of the Related Art

It is known to provide an image processing method by which, where calibration is required while n images are being consecutively formed, the processing for image formation is suspended to process calibration and resumed after the completion of this calibration processing. Moreover, it is known to provide a method by which color patches are printed at regular intervals during the use of a printer, these color patches are detected with a sensor, and color calibration values are determined on the basis of the detected colors.

SUMMARY OF THE INVENTION

The present invention provides an image forming device that can implement satisfactory color calibration.

An image forming device according to an aspect of the invention has a color calibration pattern generating unit that generates a color calibration pattern in a form according to an area where it is to be formed, and a visualizing unit that visualizes the color calibration pattern generated by the color calibration pattern generating unit.

BRIEF DESCRIPTION OF THE DRAWINGS

Preferred embodiments of the present invention will be described in detail with reference to the accompanying drawings, wherein:

FIG. 4 shows an example of test image printed by the printer device 10 with a modification according to the printing speed;

FIG. 6 is a flowchart of a first operation (S10) by the printer device 10;

FIG. 10 is a flowchart of a second operation (S20) by the printer device 10;

FIG. 11 is a flowchart of a second job generation processing (S210);

FIG. 12 shows an example of test image printed according to the combination of colors to be used in the ensuing job.

DETAILED DESCRIPTION OF THE INVENTION

A first embodiment of the present invention will be described below.

First will be described a printer device 10 to which the invention is applied.

Figure 1:
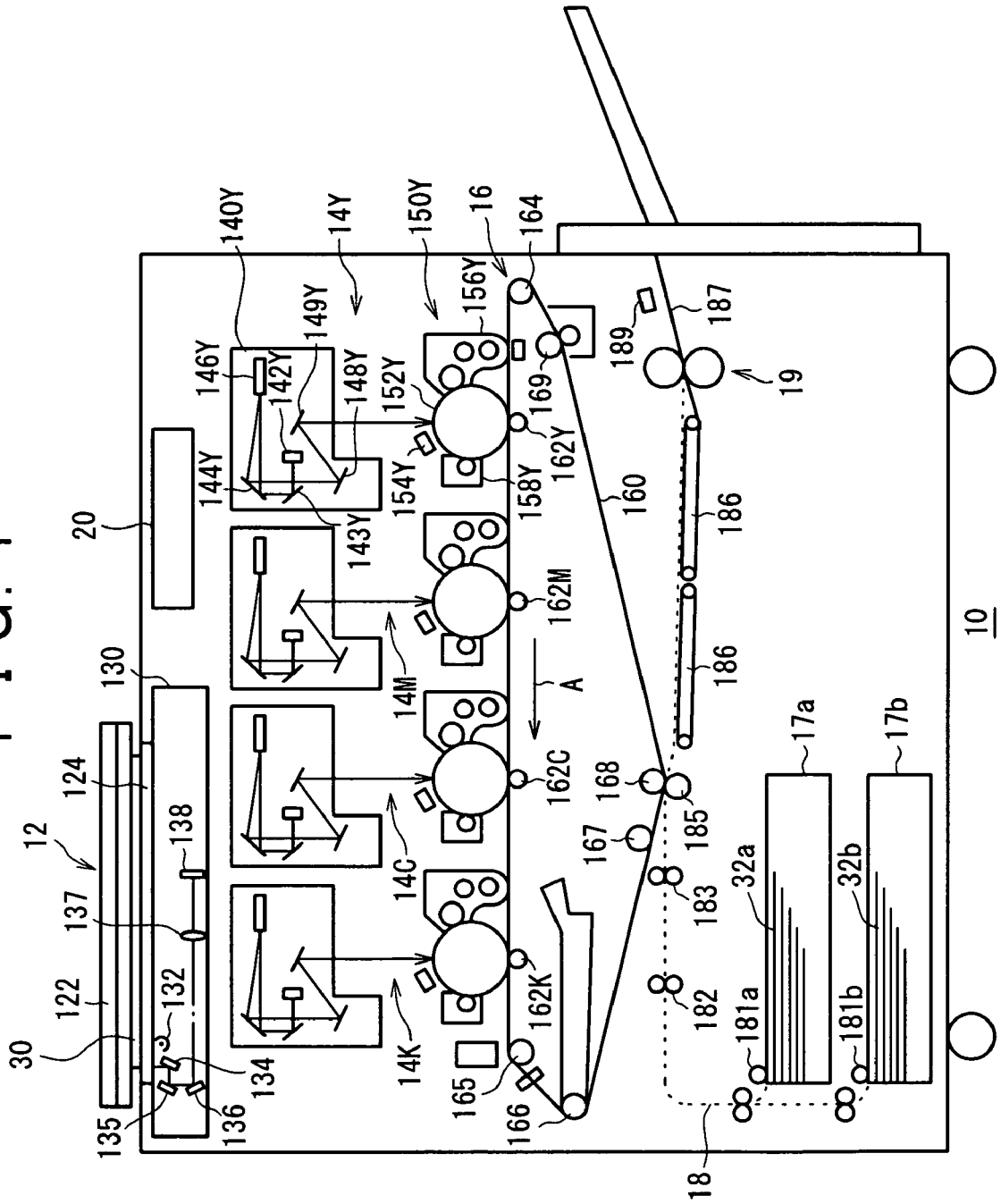
FIG. 1 illustrates the configuration of a tandem type printer device (image forming device) 10.

FIG. 1 illustrates the configuration of a tandem type printer device (image forming device) 10.

As shown in FIG. 1, the printer device 10 has an image reading unit 12, image forming units 14, an intermediate transfer device 16, plural paper sheet trays 17, a paper sheet carrying path 18, a fixer 19 and an image processing device 20. This printer device 10 may be a multifunction printer combining the function of a full color copying machine using the image reading unit 12 and that of a facsimile machine in addition to the printer function for printing image data received from a personal computer (not shown) and the like. While the tandem type printer device 10 provided with plural photosensitive drums 152 will be taken up as a specific example in the following description of this embodiment, the configuration is not limited to this, but a printer device provided with only one photosensitive drum 152, for instance, would be acceptable instead.

First to outline the printer device 10, over the printer device 10 are disposed the image reading unit 12 and the image processing device 20, which function as an input section for image data and a control section for the printer device 10, respectively. The image reading unit 12 reads an image expressed on a subject copy 30, and supplies it to the image processing device 20. The image processing device 20 acquires image data entered from the image reading unit 12 or image data entered from a personal computer (not shown) and the like via a network line such as a LAN, subjects the acquired image data to image processing such as gradation correction and resolution correction, and supplies the corrected image data to the image forming units 14.

Underneath the image reading unit 12 are arranged plural image forming units 14 matching the colors constituting color images. In this example, a first image forming unit 14Y, a second image forming unit 14M, a third image forming unit 14C and a fourth image forming unit 14K, respectively matching yellow (Y), magenta (M), cyan (C) and black (K), are disposed horizontally at regular intervals along the intermediate transfer device 16. The intermediate transfer device 16 turns an intermediate transfer belt 160 as the intermediate transfer medium in the direction of arrow A in FIG. 1. These four image forming units 14Y, 14M, 14C and 14K successively form toner images of the different colors on the basis of image data entered from the image processing device 20, and transfer these plural toner images to the intermediate transfer belt 160 (primary transfer) at the timing of the superposition of these toner images. The sequence of the colors of the image forming units 14Y, 14M, 14C and 14K are not limited to yellow (Y), magenta (M), cyan (C) and black (K), and they may be sequenced in any other way, such as black (K), yellow (Y), magenta (M) and cyan (C). According to pertaining to the present invention, the visualizing section is, for instance, a combination of the image forming units 14 and the intermediate transfer belt 160, and the color calibration pattern generating section is, for instance, the image processing device 20.

The paper sheet carrying path 18 is arranged underneath the intermediate transfer device 16. A recording paper sheet 32a or 32b fed from a first paper sheet tray 17a or a second paper sheet tray 17b is carried over this paper sheet carrying path 18, and undergoes a collective transfer (secondary transfer) of the toner images of different colors multiply transferred over the intermediate transfer belt 160. The transferred toner images are fixed by a fixer 37 and the sheet is discharged outside.

Next will be described in more detail the constituent elements of the printer device 10.

As shown in FIG. 1, the image reading unit 12 has a platen glass 124 on which to place the subject copy 30, a platen cover 122 for pressing this subject copy against the platen glass 124, and an image reading device 130 for reading the image of the subject copy 30 placed on the platen glass 124. This image reading device 130 is so configured that the subject copy placed on the platen glass 124 is illuminated by a light source 132, an image reading element 138 made up of a CCD and the like is scan-exposed with the reflected light image from the subject copy 30 via a reducing optical system made up of a full rate mirror 134, a first half rate mirror 135, a second half rate mirror 136 and an imaging lens 137, and this image reading element 138 reads the colorant reflected light image of the subject copy 30 in a prescribed dot density (e.g. 16 dots/mm).

The image processing device 20 subjects the image data read by the image reading unit 12 to prescribed image processing including shading correction, positional correction of the subject copy 30, brightness/color space conversion, gamma correction, edge erase and editing to alter color or element position. Incidentally, the colorant reflected light image of the subject copy read by the image reading unit 12 are subject copy reflectance data in three colors, for instance red (R), green (G) and blue (B) (of 8 bits each), and are converted into subject copy colorant gradation data (luster data) of four colors including yellow (Y), magenta (M), cyan (C) and black (K) (of 8 bits each) by undergoing image processing by the image processing device 20.

The first image forming unit 14Y, the second image forming unit 14M, the third image forming unit 14C and the fourth image forming unit 14K are arranged side by side in the horizontal direction at regular intervals, and are configured substantially similarly to one another except that the colors of the images formed are different. Therefore, the following description will limit itself to the first image forming unit 14Y. The constituent elements of each image forming unit 14 will be distinguished from their respective counterparts in others by suffixing Y, M, C or K to their reference numerals.

The image forming unit 14Y has an optical scanning device 140Y for scanning laser beams according to image data entered from the image processing device 20 and an image forming device 150Y by which an electrostatic latent image is formed with laser beams scanned by this optical scanning device 140Y.

The optical scanning device 140Y modulates a semiconductor laser 142Y according to image data of yellow (Y), and emits a laser beam LB(Y) from this semiconductor laser 142Y according to the image data. This laser beam LB(Y) emitted from the semiconductor laser 142Y irradiates a rotating polygon 146Y via a first reflective mirror 143Y and a second reflective mirror 144Y, is deflectively scanned by this rotating polygon 146Y, and irradiates the photosensitive drum 152Y of the image forming device 150Y via the second reflective mirror 144Y, a third reflective mirror 148Y and a fourth reflective mirror 149Y.

The image forming device 150Y includes the photosensitive drum 152Y rotating in the direction of an arrow A at a prescribed speed and serving as an image carrier, a Scorotron 154Y for primary electrical charging, which serves as a charging section that uniformly charges the surface of this photosensitive drum 152Y, a developer 156Y for developing an electrostatic latent image formed over the photosensitive drum 152Y, and a cleaning device 158Y. The photosensitive drum 152Y is uniformly charged by Scorotron 154Y, and an electrostatic latent image is formed thereon by the laser beam LB(Y) radiated by the optical scanning device 140Y. The electrostatic latent image formed on the photosensitive drum 152Y is developed by the developer 156Y with a yellow (Y) toner, and transferred to the intermediate transfer device 16. Incidentally, after the step of transferring the toner image, the residual toner, paper powder and so forth sticking to the photosensitive drum 152Y are removed by the cleaning device 158Y.

The other image forming units 14M, 14C and 14K, in the same way as described above, also form toner images of different colors including magenta (M), cyan (C) and black (K), respectively, and transfer the toner images of different colors so formed to the intermediate transfer device 16.

The intermediate transfer device 16 has the intermediate transfer belt 160 (image carrier) wound with a constant tension round a drive roller 164, a first idle roller 165, a steering roller 166, a second idle roller 167, a backup roller 168 and a third idle roller 169, and rotational driving of the drive roller 164 by a drive motor (not shown) causes this intermediate transfer belt 160 to be circularly drive in the direction of the arrow A at a prescribed speed. The intermediate transfer belt 160 is formed by shaping, for instance, a film of flexible synthetic resin, such as polyimide, into a belt, which is made endless by connecting its two ends by welding.

Further, the intermediate transfer device 16 has a first primary transfer roller 162Y, a second primary transfer roller 162M, a third primary transfer roller 162C and a fourth primary transfer roller 162K in positions respectively opposite the image forming units 14Y, 14M, 14C and 14K, and multiply transfers to the intermediate transfer belt 160 via these primary transfer rollers 162 the toner images of different colors formed on the photosensitive drums 152Y, 152M, 152C and 152K. Incidentally, the residual toner sticking to the intermediate transfer belt 160 is removed with a cleaning blade or brush of a belt cleaning device disposed downstream from the secondary transfer position.

On the paper sheet carrying path 18 are arranged a first paper feed roller 181a and a second paper feed roller 181b for taking out a first recording paper sheet 32a or a second recording paper sheet 32b from a first paper sheet tray 17a or a second paper sheet tray 17b, paired rollers 182 for carrying paper sheets, and a registration roller 183 for carrying recording paper sheets 32a and 32b at a predetermined timing to the secondary transfer position.

Further in the secondary transfer position on the paper sheet carrying path 18 is disposed a secondary transfer roller 185 pressed against the backup roller 168, and the toner images of different colors multiply transferred onto the intermediate transfer belt 160 undergo secondary transfers to a recording paper sheet 32a or 32b by the pressure and electrostatic force of this secondary transfer roller 185. The recording paper sheet 32a or 32b onto which toner images of different colors have been transferred are carried to the fixer 19 by two conveyor belts 186.

The fixer 19 melts and fixes the toners to the recording paper sheet 32a or 32b, to which the toner images of different colors have been transferred by subjecting them to heating and pressing.

A discharge path 187 as part of the paper sheet carrying path 18 is disposed at a stage following the fixer 19. The recording paper sheet 32a or 32b having undergone fixation (heating and pressing) is discharged outside the printer device 10 via the discharge path 187, and stacked on a paper discharge tray. The discharge path 187 is further provided with a colorimetric sensor 189 (detecting section). The colorimetric sensor 189 reads the image on the recording paper sheet 32a or 32b being carried on the discharge path 187, and measures the characteristic quantities of this image. The characteristic quantities measurable by the colorimetric sensor 189 are color data (including the density, saturation, hue and distribution of each color).

Next will be described the background of the attempt at the present invention and this embodiment.

The printer device 10 may suffer changes in density or gradation reproducibility of the printed image due to variations in ambience or hardware characteristics during the printing process. Especially where plural images are to be consecutively printed, ambience or hardware characteristics may vary during the printing process, resulting in differences in image quality among the plural images printed in compliance with the same printing request and accordingly conspicuous fluctuations in color development.

Therefore, it is suggested to perform color calibration processing on the basis of a test image printed by the printer device 10. The color calibration processing in this context includes test image print processing to print the test image, difference detection processing to detect differences between reference hardware characteristics and the current hardware characteristics, and adjustment processing to adjust the hardware characteristics on the basis of this difference detection processing.

In particular, the printer device 10 in this embodiment of the invention forms a test image on the recording paper 32 when printing images consecutively, and performs color calibration processing on the basis of this test image. Thus, the printer device 10 in this embodiment reduces color development fluctuations in consecutive print processing by having color calibration processing interrupt the print processing requested by the user.

It is also conceivable to perform calibration processing during consecutive printing on the basis of toner images formed on the photosensitive drums 152 or the intermediate transfer belt 160. However, toner images formed on the photosensitive drums 152 are monochromic, and therefore it is difficult to estimate color development where toners of plural colors are superposed over one another. In addition, where toner images are melted and fixed on a recording paper sheet 32, color development is affected by the surface characteristics of the recording paper 32, the sequence of the superposition of the toner images of plural colors, and the mutual influencing of the properties of these toners among other factors, making it difficult to predict the color development after fixation on the basis of the toner images formed on the intermediate transfer belt 160 or elsewhere and to perform adequate color calibration according to the prediction. Therefore, it is suggested that the printer device 10 performs color calibration processing on the basis of toner images formed on a recording paper sheet 32. It is also suggested that the image forming device 10 performs color calibration processing on the basis of toner images fixed on a recording paper sheet 32. Therefore, the printer device 10 in this embodiment reads, with the calorimetric sensor 189 disposed on the discharge path 187, a test image from the recording paper 32 being carried, and performs color calibration processing on the basis of the test image so read.

Where such color calibration processing based on a test image is performed, the printer device 10 may print test images containing as many calibration patterns as practicable on recording paper 32, because, whether in color calibration processing automatically performed by the printer device 10 or in color calibration processing performed by the user watching the test images, the greater the number of calibration patterns is, the higher the accuracy of color calibration processing is.

For the same reason, it is suggested that the printer device 10 prints test images containing as large calibration patterns as practicable on recording paper 32.

However, recording paper sheets 32 of a suitable size the printing of desired test images may not be set in either paper sheet tray 17. In this case, the user would have to take the trouble of replacing the set recording paper sheets 32 or manually insert sheets of the right size. In particular the printer device 10 in this embodiment, since color calibration processing interrupts the print processing requested by the user, having the user insert the recording paper 32 manually insert sheets of the right size would significantly affect its productivity.

Therefore, the printer device 10 in this embodiment alters the form of test images to be printed according to the area of recording paper 32 where the test images are printable. More specifically, the printer device 10 alters at least one of the factors including the number or size of calibration patterns contained in the test images and the intervals of the calibration patterns. Or the printer device 10, as an alternative way of altering test images, may as well split each test image and print the split segments of the test image on plural recording paper sheets 32.

Figure 2:
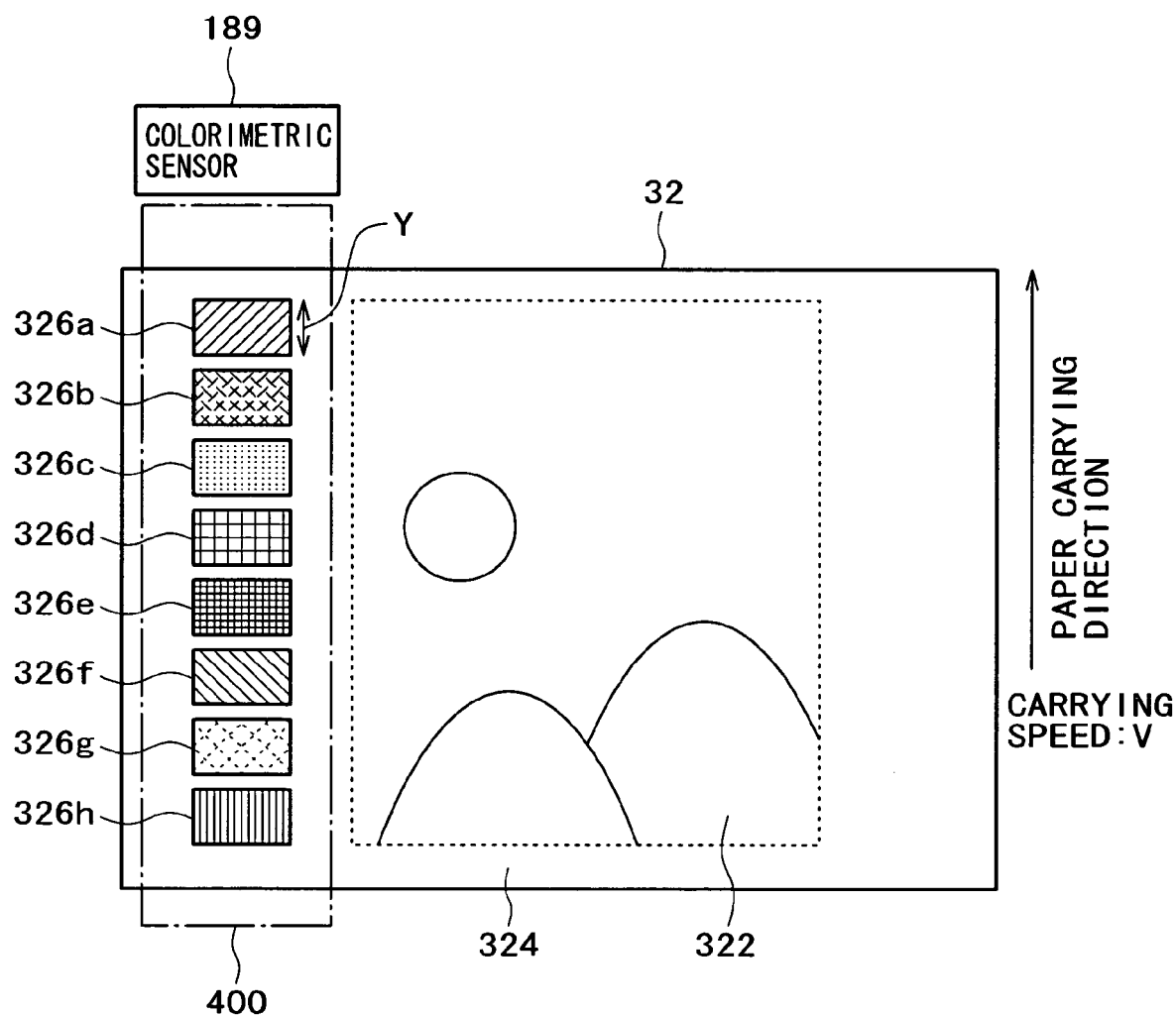
FIG. 2 shows an example of test image printed by the printer device 10.

FIG. 2 shows an example of test image printed by the printer device 10.

As illustrated in FIG. 2, the printer device 10 in this embodiment prints on the same sheet of recording paper 32 an image requested by the user to print (hereinafter referred to as the requested image) and a color calibration pattern (i.e. the test image). In doing so, the printer device 10 distinguishes between a printable area 322 where the requested image is to be printed and a non-printable area 324 where the requested image is not to be printed, and modifies a test image 326 according to the size and shape of the non-printable area 324. More specifically, the test image 326 in this example contains plural calibration patterns 326a through 326h, and at least one factor out of the number, size and intervals of the calibration patterns 326a through 326h is altered so as to maximize the number of calibration patterns printed and the size of each individual calibration pattern.

The printer device 10 in this embodiment, since the test image has to be read by the colorimetric sensor 189 fixed to the discharge path 187, modifies the test image 326 (in terms of the number, size, shape, intervals or some other factor of the calibration patterns) according to an area that can be covered by the colorimetric sensor 189 (detectable area 400).

Therefore, the printer device 10 in this embodiment alters the size and shape of the test image 326 according to the size and shape of the overlapping zone between the non-printable area 324 and the detectable area 400.

Figure 3:
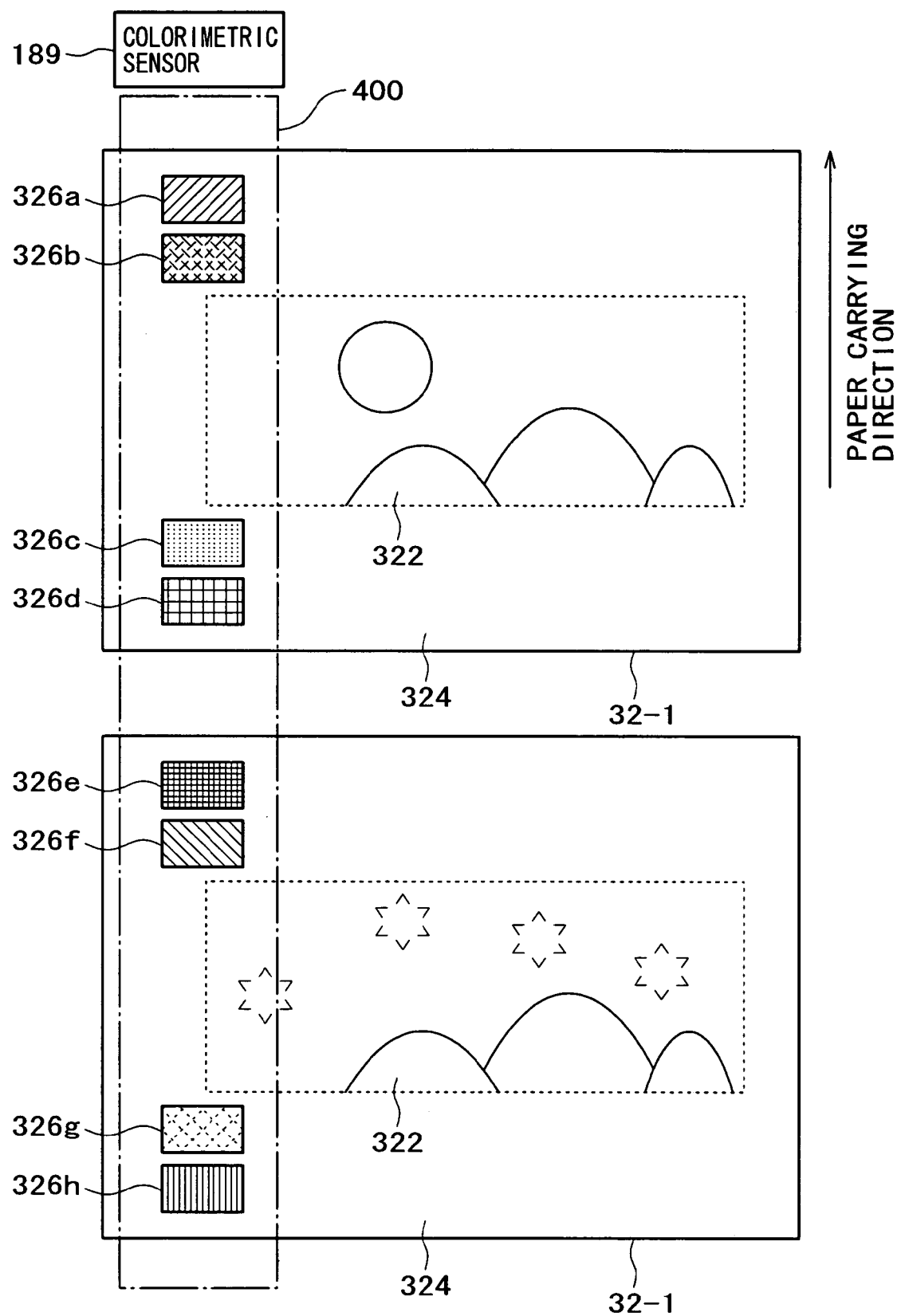
FIG. 3 shows an example of test image printed in a split form by the printer device 10.

FIG. 3 shows an example of test image printed in a split form by the printer device 10.

As illustrated in FIG. 3, since the overlapping zone between the non-printable area 324 and the detectable area 400 is smaller than what is shown in FIG. 2, it is not always possible to print all the calibration patterns 326a through 326h contained in the test image 326 on a single sheet of recording paper 32.

In view of this point, the printer device 10 in this embodiment splits the test image 326 into a first test image containing the calibration patterns 326a through 326d and a second test image containing the calibration patterns 326*e* through 326*h*, and prints the first test image on a first recording paper sheet 32-1 and the second test image on a second recording paper sheet 32-2.

FIG. 4 shows an example of test image printed by the printer device 10 with a modification according to the printing speed.

The printer device 10 performs print processing in plural operating modes. The operating modes in this context are the patterns of operation of the constituent elements of the printer device 10 including the image forming units 14 or the intermediate transfer device 16, and are set on the basis of the size or weight of the recording paper sheet 32, the type of the image (color or monochrome), the resolution of the image, whether the sheet is to be printed on both faces or on only one face, or the user's specification (the user-chosen mode). The number of sheets that can be printed per unit length of time (i.e. the printing speed of) the printer device 10 differs from one operating mode to another. Therefore, the speed at which the recording paper sheets 32 bearing printed images are discharged via the discharge path 187 differs with the operating mode.

With this difference in the discharging speed of the recording paper 32, also varies the accuracy at which the calorimetric sensor 189 reads the test image. Thus the faster the discharging of the recording paper 32 is, the inferior the accuracy of reading the test image is. To overcome this disadvantage, the printer device 10 in this embodiment prints the calibration patterns 326*a* through calibration pattern 326*h* contained in the test image on a scale enlarged at least in the carrying direction according to the discharging speed of the recording paper 32 as illustrated in FIG. 4. More specifically the printer device 10, when the carrying speed on the discharge path 187 (i.e. in the vicinity of the colorimetric sensor 189) has become twice as fast, prints on the recording paper 32 the test image 326 in which the calibration patterns 326*a* through 326*h* are enlarged twofold in the carrying direction. Then, as the test image 326 to be printed is made too large to be accommodated in a single sheet of recording paper 32, the printer device 10 splits the enlarged test image into the first recording paper 32-1 and the second recording paper 32-2, both of which are printed.

The carrying speed may be slowed down when a recording paper sheet 32 on which a test image is printed may pass two or more times a position detectable by the calorimetric sensor 189 in the two-face printing mode or some other situation when this recording paper sheet 32 changes its carrying direction in the vicinity of the colorimetric sensor 189. In such a case, the printer device 10 may alter the size of the calibration patterns 326*a* through 326*h* according to the number of times the position detectable by the colorimetric sensor 189 is passed or the speed at which the position detectable by the calorimetric sensor 189 is passed.

Next will be explained how the image processing device 20 controls the above-described print processing of the test image 326 and the color calibration processing based on this test image 326.

Figure 5:
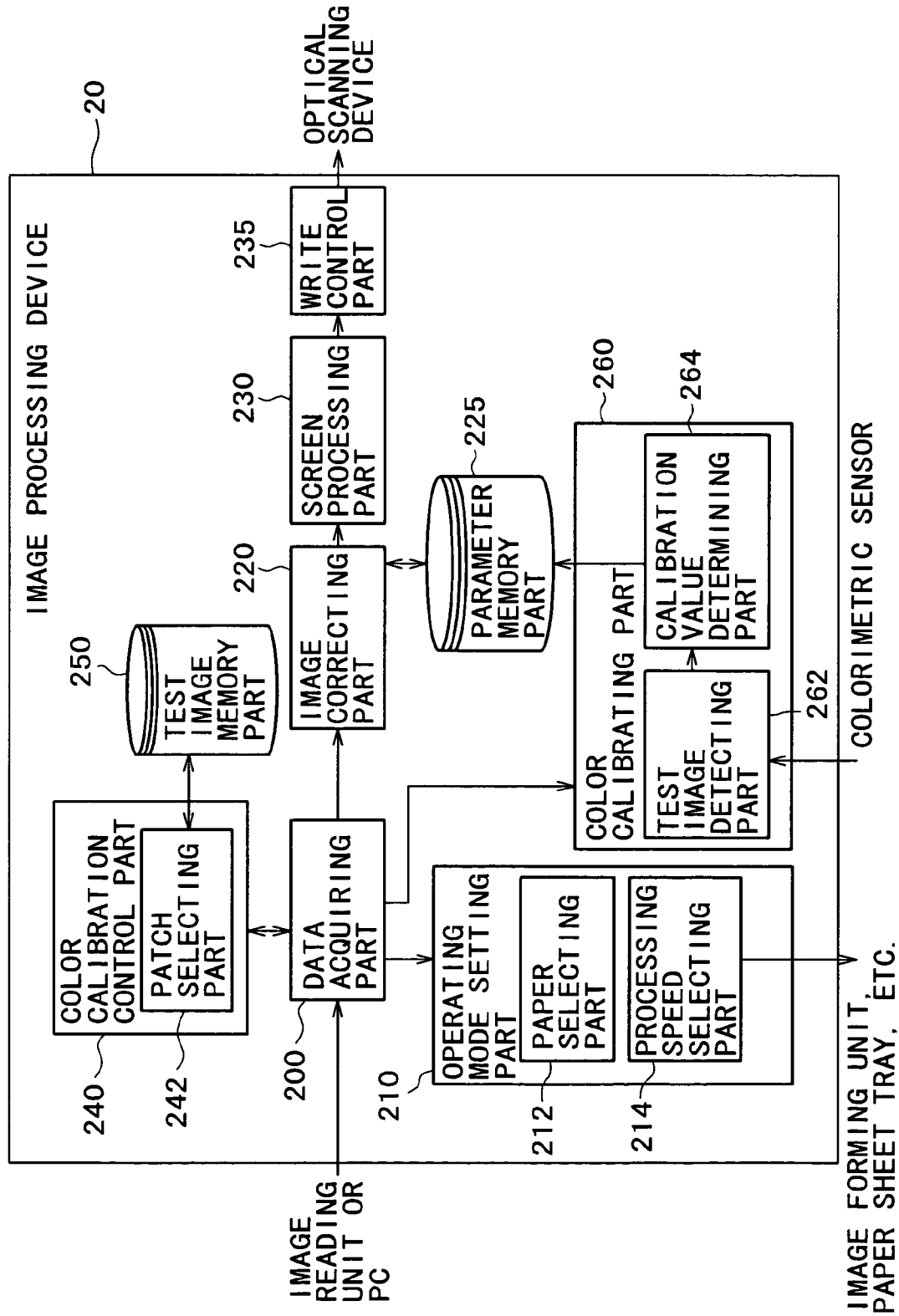
FIG. 5 shows an example of functional configuration of a first image processing device 20.

FIG. 5 shows an example of functional configuration of the first image processing device 20.

As illustrated in FIG. 5, the image processing device 20 includes a data acquiring part 200, an operating mode setting part 210, an image correcting part 220, a parameter memory part 225, a screen processing part 230, a write control part 235, a color calibration control part 240, a test image memory part 250 and a color calibrating part 260. The operating mode setting part 210 includes a paper selecting part 212 and a processing speed selecting part 214; the color calibration control part 240 includes a patch selecting part 242; and the color calibrating part 260 includes a test image detecting part 262 and a calibration value determining part 264.

To add, the constituent elements of the image processing device 20 described above may be implemented by either software or hardware.

The data acquiring part 200 acquires print request data including image data and the like from either the image reading unit 12 (FIG. 1) or the user's personal computer, and generates at least one job on the basis of the acquired image data. A job is the unit of processing in the image processing device 20, the image forming units 14, the intermediate transfer belt 160, the paper sheet trays 17, the paper sheet carrying path 18 and the fixer 19. A job may be, for instance, a usual job involving only the printing of a requested image or a calibration job involving the printing of a test image. These jobs include information defining the image data to be printed and the operating mode (hereinafter referred to as mode defining information). This mode defining information includes the number of copies to be printed, the type of recording paper to be used for printing, distinction between color and monochrome, the type of screen and the resolution of output. The data acquiring part 200, upon generating a job, supplies the generated job to the image correcting part 220, the operating mode setting part 210 and the like.

Also, the data acquiring part 200 generates a calibration job as controlled by the color calibration control part 240. The data acquiring part 200 in this embodiment, as illustrated in FIG. 2 through FIG. 4, generates as the calibration job a job to print a synthesized image in which a requested image and a test image are synthesized. More specifically, the data acquiring part 200 alters the contents of a usual job that has been generated, and generates a calibration job. Therefore, a calibration job in this example includes image data in which a requested image and test images are synthesized and mode defining information among others.

The data acquiring part 200, when generating a calibration job, supplies the color calibrating part 260 with identifying information for a test images contained in the calibration job.

The operating mode setting part 210 determines an operating mode according to the job (mode defining information) entered from the data acquiring part 200, and causes the image forming units 14 (FIG. 1), the intermediate transfer device 16, the paper sheet trays 17, the paper sheet carrying path 18, the fixer 19 and so forth in the determined operating mode.

More specifically, there are made ready in advance plural operating patterns for each of the image forming units 14, the intermediate transfer device 16, the paper sheet trays 17, the paper sheet carrying path 18 (in particular the registration roller 183), the fixer 19 and so forth, and the operating patterns of these constituent elements are matched to operating modes. The operating mode setting part 210 includes the paper selecting part 212 and the processing speed selecting part 214, sets operating modes on the basis of mode defining information, and causes the paper selecting part 212 and the processing speed selecting part 214 to operate their respective constituent elements (including the image forming units 14, the intermediate transfer device 16, the paper sheet trays 17, the paper sheet carrying path 18 and the fixer 19) in the operating pattern matching the set operating mode. The available operating modes include, for instance, a high resolution mode in which the resolution is high but the printing speed (the number of sheets printed per unit length of time) (corresponding to a first processing speed) and a low definition mode in which the resolution is low but the printing speed is high (corresponding to a second processing speed).

The paper selecting part 212 selects one type of recording paper 32 out of plural types of recording paper (the recording paper 32a and the recording paper 32b in this example) in accordance with the user's request by controlling the paper sheet trays 17, the paper feed rollers 181 and the like, and causes the selected recording paper 32 to be fed to the paper sheet carrying path 18 at a timing matching the operating mode.

The processing speed selecting part 214 determines the speed of print processing according to the distinction between color and monochrome, the resolution of output, the size of recording paper and other factors, and causes the image forming units 14, the intermediate transfer device 16, the paper sheet trays 17, the paper sheet carrying path 18 (including the discharge path 187), the fixer 19 and so forth. The processing speed selecting part 214 controls the intervals between the toner images transferred onto the intermediate transfer belt 160 and the timing of the carriage the recording paper 32 by the registration roller 183 according to, for instance, the size of the image to be supplied (e.g. the size of the recording paper 32). Also, the processing speed selecting part 214 controls the speeds of writing by the optical scanning devices 140 and the turning speeds of the photosensitive drums 152, the intermediate transfer belt 160 and the fixer 19 according to the resolution of the image to be outputted.

The image correcting part 220, when a job is entered from the data acquiring part 200, subjects the image data of this job to gradation correction, sharpness correction and correction in any other respect, and supplies the corrected data to the screen processing part 230. In doing so, the image correcting part 220 references a look-up table stored in the parameter memory part 225 and determines the quantities of the gradation correction and the sharpness correction. The parameter memory part 225 stores coefficients of correction for use in various corrections including gradation correction and sharpness correction, and the image correcting part 220 performs corrections, on the basis of coefficients of correction stored in the parameter memory part 225, so that the entered image data is reproduced on the recording paper 32 in the desired color and sharpness.

The screen processing part 230 subjects (multi-value) image data entered from the image correcting part 220 to screen processing to convert them into two-value image data, and supplies the converted data to the write control part 235. The screen processing part 230 switches over the screen according to the attribute (photographic image, character image, line drawing or whatever else) of the image. If, for instance, a photographic image area and a character image area are mixed in one page of image, the screen processing part 230 switches over the screen for each of these image areas.

The write control part 235 controls the optical scanning devices 140 (FIG. 1) according to the (two-value) image data entered from the screen processing part 230. For instance, the write control part 235 intermittently turns on the optical scanning devices 140 by generating a pulse signal according to the entered image data (two-value) and supplying this pulse signal to the optical scanning devices 140.

The color calibration control part 240 controls color calibration processing in the printer device 10. More specifically, where plural jobs are to be generated consecutively, the color calibration control part 240 causes the data acquiring part 200 to convert one of these jobs into a calibration job. Thus, the color calibration control part 240 causes color calibration processing to interrupt print processing requested by the user.

In more specific terms, in the color calibration control part 240, the patch selecting part 242 selects and reads one out of the plural test images stored in the test image memory part 250 according to the area where the requested image is to be printed (the printable area 322), the area readable by the calorimetric sensor 189 (the detectable area 400), the type of recording paper 32 to be printed on and the operating mode (processing speed, whether or not to print both faces), designates the area where to print the test image, and supplies data of this test image to the data acquiring part 200.

To add, it is also conceivable for the color calibration control part 240 to determine whether or not outputs from a timer for measuring the lapse of time, a counter for counting the number of sheets printed, a residual sensor for detecting the residual quantity of toner, an ambience sensor for detecting the quantity of any variation in ambient conditions, such as temperature or humidity, and a density sensor for detecting the density of a toner image formed on the intermediate transfer belt 160 (hereinafter referred to as various sensors) are within respectively prescribed ranges, and to cause a calibration job to be generated to perform color calibration processing only when any range is surpassed.

In the color calibrating part 260, the test image detecting part 262 controls the calorimetric sensor 189 (FIG. 1) to read the test image 326 (FIG. 2 through FIG. 5) printed on the recording paper 32, and measures the characteristic quantities of the test image 326. The characteristic quantities to be measured include, for instance, the density of the color matching each calibration pattern. A test image detecting part 232 supplies the measured characteristic quantities to the calibration value determining part 264.

The calibration value determining part 264 compares characteristic quantities entered from the test image detecting part 232 with reference values which are the target values of color calibration processing (fixed values matching the type of test image), determines a color calibration value according to a difference value between each of these characteristic quantities and the pertinent reference value, and updates the look-up table stored in the parameter memory part 225 according to this color calibration value. That is, the calibration value determining part 264 determines calibration values for hardware on the basis of the characteristic quantities entered from the test image detecting part 262, and adjusts, according to these calibration values the colors of the image to be supplied by the printer device 10. In particular, it is desirable for the test image detecting part 262 to measure characteristic quantities of colors to be developed by toners of plural colors and for the calibration value determining part 264 to determine color calibration values on the basis of the characteristic quantities pertaining to these toners of plural colors.

To add, though color calibration of the printer device 10 is performed in this embodiment of the invention by having the color calibrating part 260 update the look-up table (of coefficients of correction for image data) stored in the parameter memory part 225, this is not the only way to achieve the purpose, but color calibration of the printer device 10 can as well be implemented by, for instance, adjustment of secondary transfer processing (in terms of pressure or electrostatic force applied) by the secondary transfer roller 185 or adjustment of fixation (in terms of heating temperature or pressure applied) by the fixer 19 thereby to adjust of the color development of the image formed on the recording paper 32.

FIG. 6 is a flowchart of an operation (S10) by the printer device 10.

As charted in FIG. 6, at step 100 (S100), the user makes a printing request via his or her personal computer or the user interface device of the printer device 10. The data acquiring part 200, when print request data (including the number of sheets to be printed, the type of recording paper (including the direction of carriage), whether to print on both faces or on only one face, and information designating color or monochrome) is inputted, acquires via a network or the image reading unit 12 image data on the requested image according to this print request data, and stores the acquired image data and the print request data being correlated to each other.

At step 110 (S110), the data acquiring part 200 generates plural jobs (usual job and calibration job) by splitting the image data to be printed on the basis of the number of sheets to be printed or some other criterion, and supplies the generated jobs to the image correcting part 220 and the operating mode setting part 210.

At step 130 (S130), the operating mode setting part 210 determines as mode defining information the type of recording paper 32, the resolution of output, whether to print on both faces or on only one face, and the distinction between color and monochrome on the basis of a job entered from the data acquiring part 200, and determines the operating mode according to the determined mode defining information.

The paper selecting part 212 selects one of the paper sheet trays 17 according to the determined operating mode, and causes the recording paper 32 to be supplied from the selected paper sheet tray 17 at a timing matched to the operating mode.

Further, the processing speed selecting part 214 sets, according to the determined operating mode, the speed of toner image formation by the image forming units 14, the turning sped of the intermediate transfer device 16, and the paper carrying speed of the paper sheet carrying path 18 (including the discharge path 187) among other factors.

At step 135 (S135), the data acquiring part 200 determines whether the job being processed is a usual job or a calibration job. If the job being processed is a calibration job, the image processing device 20 will shift to the processing of S140, or otherwise will shift to that of S160.

At step 140 (S140), the printer device 10 forms on the recording paper 32 a synthesized toner image made up of the requested image and the test image according to the generated calibration job. More specifically, the image correcting part 220 applies picture quality corrections including gradation correction to the image data (what are included in the calibration job) of the synthesized image entered from the data acquiring part 200, and supplies the corrected data to the screen processing part 230. In performing the picture quality corrections, the image correcting part 220 references the look-up table stored in the parameter memory part 225 and determines the quantities of correction on that basis.

The screen processing part 230 selects a screen (e.g. a dither matrix) according to the attribute (photographic image, character image, line drawing, etc.) of the image data entered from the image correcting part 220 or additional information (such as tag data appended to image data), converts the image into two-value data by use of the selected screen, and supplies the two-value data to the write control part 235. The write control part 235 intermittently turns on the optical scanning devices 140 according to the image data (two-value) of the synthesized image entered from the screen processing part 230, and causes an electrostatic latent image (synthesized image) to be written onto the surfaces of the photosensitive drums 152.

The latent image written onto the photosensitive drums 152 is developed with toners of various colors by the developers 156, and the developed toner images of the various colors are multiply transferred to the intermediate transfer device 16. The toner images multiply transferred to the intermediate transfer device 16 are further transferred in the secondary transfer position to the recording paper 32 supplied from the paper sheet tray 17.

At step 145 (S145), the recording paper 32 onto which the toner image (synthesized image) has been transferred is carried to the fixer 19 to be subjected to fixation processing. The recording paper 32 having undergone fixation processing is discharged out of the device past the discharge path 187. The recording paper 32 having undergone fixation processing is carried over the discharge path 187 at a speed matching the operating mode.

At step 150 (S150), the colorimetric sensor 189 disposed on the discharge path 187, in response to control by the test image detecting part 262, reads the test image from the recording paper 32 carried over the discharge path 187, and supplies the read test image to the test image detecting part 262.

The test image detecting part 262, on the basis of the test image entered from the colorimetric sensor 189, measures characteristic quantities of this test image, and supplies the measured characteristic quantities to the calibration value determining part 264.

At step 155 (S155), the calibration value determining part 264 computes the difference value between each characteristic quantity of the test image entered from the test image detecting part 262 and a reference value preset as the target value (a fixed value matched with identifying information for the test image), and updates according to the computed difference value the look-up table stored in the parameter memory part 225. The updating of the look-up table (i.e. having the result of color calibration reflected) may be carried out at a timing of switching over the job.

At step 160 (S160), the printer device 10 forms the toner image of the requested image on the recording paper 32 according to the generated usual job. More specifically, the formation of the toner image of the requested image is accomplished by substantially the same process as that of step 140 above.

At step 165 (S165), the recording paper 32 onto which the toner image (the requested image) has been transferred is carried to the fixer 19 to be subjected to fixation processing. The recording paper 32 having undergone fixation processing is discharged out of the device past the discharge path 187.

At step 170 (S170), the data acquiring part 200 determines whether or not there is any ensuing job and, if there is any, returns to the processing of S130 to perform processing pertaining to the next job, or otherwise ends the print processing (S10).

In this way, this printer device 10 carries out print processing requested by the use by generating one or more jobs in response to the print request and successively processing the generated jobs. Further, the printer device 10 prints the test image during print processing by making part of the generated jobs a calibration job, and performs color calibration processing on the basis of the printed test image.

Next will be described in more detail job generation by the printer device 10.

Figure 7:
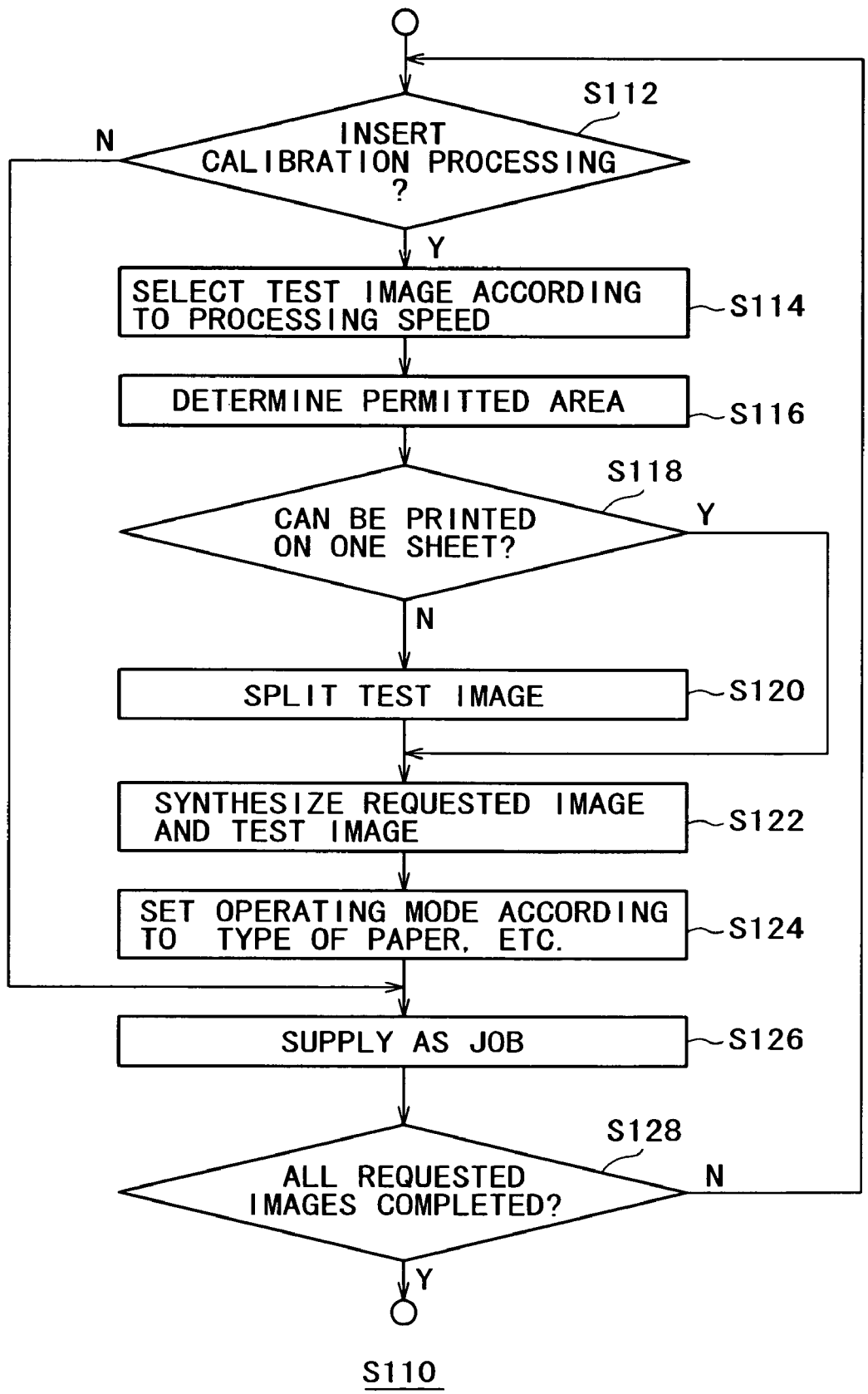
FIG. 7 is a flowchart of a first job generation processing (S110)

FIG. 7 is a flowchart of job generation processing (S110).

As charged in FIG. 7, at step 112 (S112), the data acquiring part 200 specifies mode defining information including the number of sheets to be printed, the resolution of output, the distinction between color and monochrome, and the type of recording paper 32 on the basis of the entered print request data and the image data of the requested image, and generates plural usual jobs by splitting the requested image according to these items of mode defining information (the switch-over of the operating mode and the number of sheets to be printed).

The color calibration control part 240 acquires output values from various sensors at predetermined timings and determines, according to the acquired output values, whether or nor to convert a usual job generated by the data acquiring part 200 into a calibration job. The color calibration control part 240, if it determines that the usual job should be converted into a calibration job, shifts to the processing of S114 or otherwise forbids conversion to a calibration job (i.e. causes a usual job to be generated) and shifts to the processing of S124.

At step 114 (S114) the patch selecting part 242, on the basis of mode defining information on the usual job to be converted into calibration job, specifies the operating mode (processing speed) in this job and selects, out of the plural test images stored in the test image memory part 250, the test image matching the specified operating mode (processing speed). Incidentally, the test image memory part 250 in this example stores plural test images differing in the size, shape or arrangement of calibration patterns to match different operating modes (processing speeds).

At step 116 (S116) the color calibration control part 240, on the basis of the mode defining information, specifies the size, shape and carrying direction (the direction of the long sides or of the short sides) of the recording paper 32 and determines, on the basis of the specified recording paper 32, the detectable area 400 of the colorimetric sensor 189 and image data on the requested image, the area where printing of the test image is permitted.

At step 118 (S118), the color calibration control part 240 compares the area where printing of the test image is permitted (hereinafter referred to simply as the permitted area) with the test image selected by the patch selecting part 242, and determines whether or not this test image can be printed in the permitted area of a single sheet of recording paper 32. The color calibration control part 240, if it determines that the test image cannot be printed on a single sheet of recording paper 32, will shift to the processing of S120 or, if it determines that it can be, will shift to the processing of S122.

At step 120 (S120), the color calibration control part 240 splits the test image selected by selected by the patch selecting part 242 so that each segment can be accommodated in the permitted area of the recording paper 32.

At step 122 (S122), the color calibration control part 240 synthesizes the test image selected by the patch selecting part 242 (including the split test image) and the requested image. Then the color calibration control part 240 instructs the data acquiring part 200 to convert a usual job into a calibration job, and supplies the synthesized image data to the data acquiring part 200.

At step 124 (S124), the data acquiring part 200 appends, to the image data of the synthesized image entered from the color calibration control part 240, mode defining information on the original usual job to make it a calibration job. Thus, the data acquiring part 200 converts the usual job into the calibration job without altering the operating mode set for the requested image.

At step 126 (S126), the data acquiring part 200 supplies as jobs the generated usual jobs and calibration jobs successively to the image correcting part 220 and the operating mode setting part 210.

At step 128 (S128), the data acquiring part 200 determines whether or not all the jobs to be generated in response to the print request data have been supplied. The data acquiring part 200, if all have been supplied, will end the job generation processing (S110) or otherwise return to the processing of S112 to continue the generation of jobs (usual jobs or calibration jobs).

As hitherto described, the printer device 10 in this embodiment determines the area where printing of the test image is permitted according to the size of the recording paper 32, the size and arrangement of the requested image, and the area readable by the colorimetric sensor 189, and splits the test image according to the determined area. In this way, even if the desired test image cannot be accommodated by the recording paper 32 set in the paper sheet trays 17, the printer device 10 can automatically split the test image and print the split segments on plural sheets of the recording paper 32.

Further, this printer device 10 varies the size of the test image to be printed on the recording paper 32 according to the operating mode of hardware. By doing so, the printer device 10 can prevent the accuracy of detecting the test image from being varied by fluctuations in the carrying speed of the recording paper 32 (especially the speed in the vicinities of the calorimetric sensor 189).

Also, this printer device 10 may select, according to the area in which printing of a test image is permitted, as large a test image as practicable (i.e. a test image containing as many calibration patterns as practicable or a test image in which the individual calibration patterns contained are large) and print it on the recording paper 32. This enables the printer device 10 to enhance the accuracy of detecting test images. Further, this printer device 10, where plural types of recording paper 32 are accommodated in plural paper sheet trays 17, can as well be so configured as to select recording paper 32 of the largest size for test images and print test images according to the size of the selected recording paper 32. This would enable the printer device 10 to secure an ample area for printing test images and to enhance the accuracy of detecting test images.

Next will be described a second embodiment of the present invention.

Whereas the printer device 10 in the above-described first embodiment prints the requested image and the test image on the same type of recording paper 32, the requested image and the test image as well may be printed on different types of recording paper 32. In this case, the printer device 10 may use recording paper 32 of as large a size as practicable for printing test images.

However, where the printer device 10 is to cause test image print processing to interrupt ongoing consecutive print processing, interruption by print processing using recording paper 32 of a larger size might invite a drop in productivity due to the alteration of the operating mode and the like.

In view of this problem, the printer device 10 in the second embodiment, by selecting the type of recording paper 32 for use in printing test images according to the operating mode of print processing, eliminates the possibility of having to alter the operating mode when causing the test image print processing to interrupt.

Also the printer device 10, where the test image printed on recording paper 32 is small, secures higher accuracy of detecting the test image by slowing down the speed of carrying this recording paper 32.

Figure 8A:
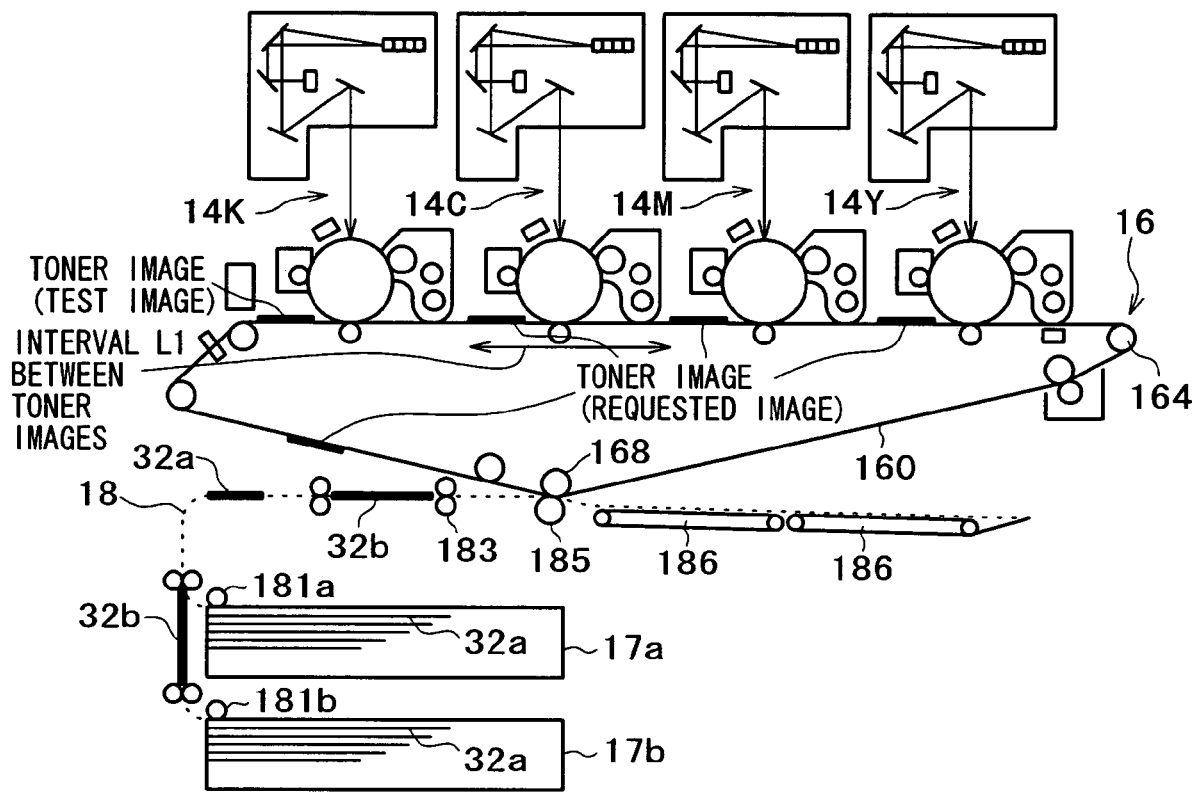
FIG. 8A illustrates the relationship between the size of recording paper 32 or of the test image and the operating mode, and FIG. 8B, a method by which the carrying speed of the recording paper 32 is slowed down without altering the operating mode of paper sheet trays 17.
Figure 8B:
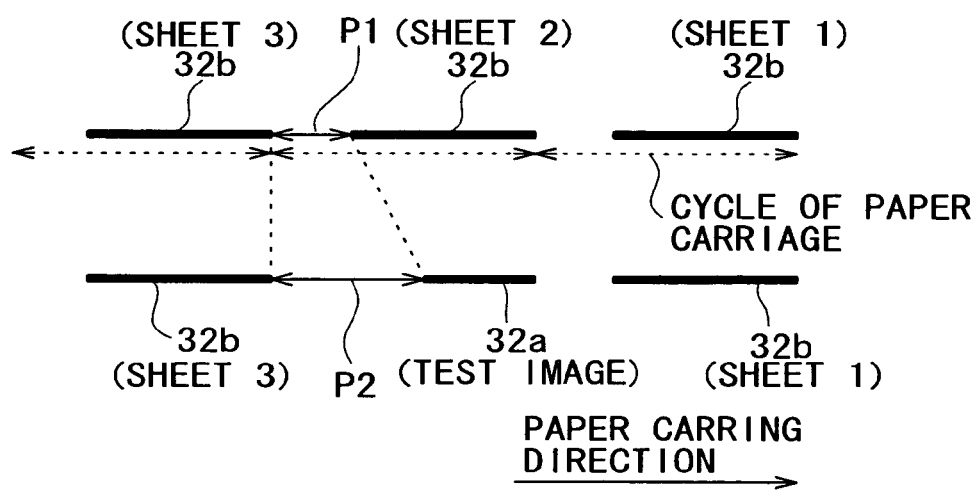

FIG. 8A illustrates the relationship between the size of the recording paper 32 or of the test image and the operating mode, and FIG. 8B illustrates a method by which the carrying speed of the recording paper 32 is slowed down without altering the operating mode of the paper sheet trays 17.

As shown in FIG. 8A, plural toner images are formed on the intermediate transfer belt 160 at intervals according to the operating mode. These intervals L1 of the toner images are determined by the speed of toner image formation by the image forming units 14, the size of the toner image that are formed, and the turning speed of the intermediate transfer belt 160 (i.e. the operating mode of the printer device 10) among other factors. Therefore, where the printer device 10 is to cause processing to print test images interrupt the printing of the requested image, there is an upper limit to the size of test images that can be printed without altering the operating mode (i.e. the size is limited by the intervals L1).

Further, since the toner image on the intermediate transfer belt 160 and the sheet of recording paper on the paper sheet carrying path 18 have to be synchronized with each other in the secondary transfer position, when the operating mode of the paper sheet trays 17 (more specifically the supply timing of recording paper) is altered, the operating modes of the image forming units 14 and the intermediate transfer device 16 also need to be altered. Therefore it is suggested to print the test image without altering the operating mode of the paper sheet trays 17, but there is an upper limit to the size of recording paper 32 that can be carried without altering the operating mode of the paper sheet trays 17.

Thus, where the print processing of test images is to interrupt the print processing of the requested image without altering the operating mode, it is often difficult for the printer device 10 to print any larger test image than the requested image.

In view of this problem, the printer device 10 in the second embodiment prints test images that can be printed in the same operating mode as that of the print processing of the requested image (for instance, test images smaller than the requested image) on the recording paper 32a, which is smaller than the recording paper 32b, on which the requested image is to be printed. This enables the printer device 10 to cause the print processing of the test image to interrupt without having to alter the operating mode and, as will be further described afterwards, slow down the carrying speed of the recording paper 32a on which the test image is printed.

Thus, as shown in FIG. 8B, the printer device 10, in a given operating mode, is supplying the recording paper 32b at a constant timing (cycle of paper carriage). Therefore, sheets of the recording paper 32b that are supplied at fixed paper feed internals P1.

Now, when the printer device 10 prints the test image on the recording paper 32a, which is smaller than the recording paper 32b, the paper feed interval P2 between a sheet of this recording paper 32a and the sheet of the recording paper 32b that follows becomes greater than the paper feed interval P1. In this case, the printer device 10, by slowing down the carrying speed of the recording paper 32a to match the paper feed interval P2, can not only prevent the carried sheets of the recording paper 32 from colliding against each other but also read more accurately the test image from the recording paper 32 being carried.

Thus the printer device 10, by printing the test image on smaller sheets of recording paper that the recording paper used for printing the requested image, can slow down the carrying speed of the recording paper on which the test image is printed at least in the vicinities of the calorimetric sensor 189 without having to alter the operating modes of the image forming units 14, the intermediate transfer device 16 and the paper sheet trays 17, and can thereby enhance the accuracy of reading the test image.

Figure 9:
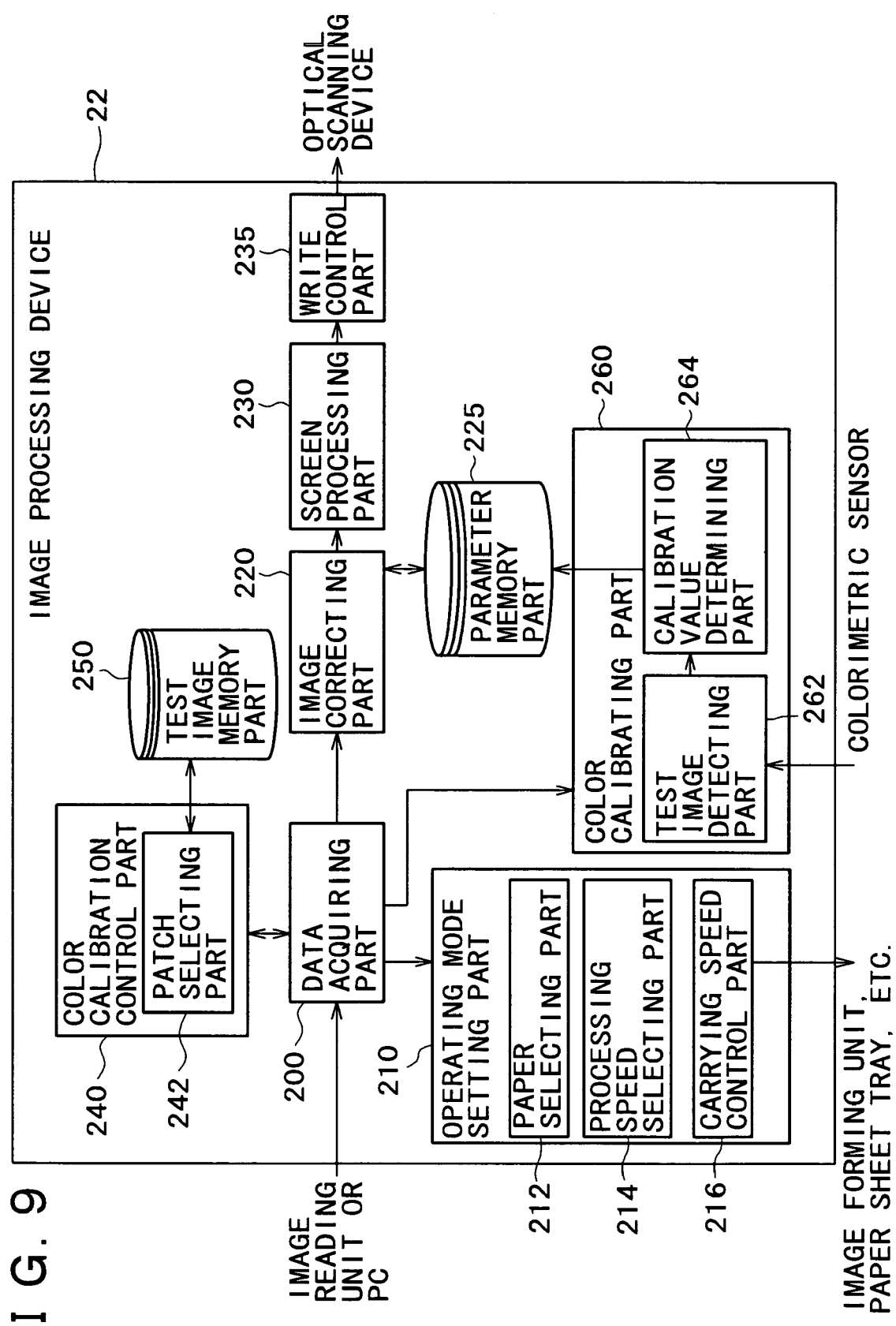
FIG. 9 shows an example of functional configuration of a second image processing device 22.

FIG. 9 shows an example of functional configuration of a second image processing device 22.

As shown in FIG. 9, the second image processing device 22 has a configuration in which a carrying speed control part 216 is added to the operating mode setting part 210 of the first image processing device 20 (FIG. 5). Incidentally, out of the constituent elements of the image processing device 22 shown in FIG. 9, those substantially similar to those in the configuration shown in FIG. 5 are designated by respectively the same reference signs.

The data acquiring part 200 generates a usual job and a calibration job in response to control by the color calibration control part 240. The calibration job in this embodiment is a job of printing only test images. The mode defining information contained in this calibration job contains information to designate the same operating mode as that of the immediately preceding usual job and paper type specifying information that specifies a type of recording paper which is smaller at least in the carrying direction than the recording paper used in the immediately preceding usual job.

The paper selecting part 212 controls the paper sheet trays 17 according to the job entered from the data acquiring part 200 and, where only the requested image is to be printed, causes the type of recording paper 32 conforming to the user's instruction to be supplied or, where a test image for color calibration is to be printed, causes a type of recording paper smaller than what was used in the preceding usual job to be supplied.

The carrying speed control part 216, when a calibration job is being executed, sets a paper carriage sequence so as to slow down at least in the vicinities of the colorimetric sensor 189 the carrying speed of the recording paper 32 on which the test image is printed, and causes the recording paper 32 to be carried in the carriage sequence so set.

FIG. 10 is a flowchart of an operation (S20) by the printer device 10 in the second embodiment of the invention. Incidentally in this chart, the steps of processing which are substantially the same as corresponding ones shown in FIG. 6 are designated by respectively the same reference signs.

As charted in FIG. 10, first the data acquiring part 200 acquires print request data from the user and image data of the requested image (S100).

At step 210 (S210), the data acquiring part 200 generates at least one usual job on the basis of the entered print request data and the image data of the requested image, and inserts calibration jobs at predetermined intervals.

The data acquiring part 200 determines whether the job being processed is a usual job or a calibration job and, if the job being processed is a calibration job, shifts to processing at S240 (S135).

At step 240 (S240), the printer device 10 forms on the recording paper 32 the toner image of the test image according to the generated calibration job. Incidentally, the test image so formed on the recording paper 32 is smaller than the requested image in the usual job immediately before. Also, the recording paper 32 on which the test image is formed is smaller at least in the length in the carrying direction than the usual job immediately before.

At S145, the recording paper 32 onto which the toner image (the test image) has been transferred is carried to the fixer 19 to undergo fixation.

At step 245 (S245), the recording paper 32 having undergone fixation processing is discharged out of the device past the discharge path 187. In this process, the carrying speed control part 216 carries the recording paper 32 having undergone fixation processing (the paper on which the test image is printed) in accordance with the paper carriage sequence set for the test image. The carrying speed control part 216 after the fixation processing slows down the speed of carrying the recording paper on which the test image is printed according to the paper feed interval P2 within the extent that this recording paper on which the test image is printed does not collide with the ensuing recording paper.

At step 150 (S150), the colorimetric sensor 189 provided on the discharge path 187 reads, in response to control by the test image detecting part 262, the test image from the recording paper 32 carried over the discharge path 187, and supplies the read test image to the test image detecting part 262.

FIG. 11 is a flowchart of job generation processing (S210) in the second embodiment of the invention.

As charted in FIG. 11, at step 212 (S212), the data acquiring part 200 specifies mode defining information including the number of sheets to be printed, the distinction between color and monochrome, the resolution of output, and the type of recording paper on the basis of the entered print request data and the image data of the requested image, splits the image data of the requested image according to these items of mode defining information (the switch-over of the operating mode and the number of sheets to be printed), and starts generating sequentially the jobs to be processed.

The color calibration control part 240 acquires output values from various sensors at predetermined timings, and determines whether or not a calibration job is to be inserted according to the acquired output values. The color calibration control part 240, if it determines that a calibration job is to be inserted, instructs the data acquiring part 200 to generate a calibration job and shifts to processing of S214, or otherwise shifts to processing of S228 to have the data acquiring part 200 continue generation of usual jobs.

At step 214 (S214), the color calibration control part 240 selects out of the types of recording paper set in the paper sheet trays 17 the type of recording paper 32 that can be carried in the operating mode of the usual job immediately before (for instance, smaller recording paper than what was used in the usual job immediately before), and generates paper designating information on the selected recording paper.

Also, the patch selecting part 242 selects a predetermined test image out of plural test images stored in the test image memory part 250.

At step 216 (S216), the color calibration control part 240 determines the area where printing of the test image is permitted on the basis of the size of the selected recording paper 32 and the detectable area 400 of the calorimetric sensor 189.

At step 218 (S218), the color calibration control part 240 compares the area where printing of the test image is permitted (hereinafter referred to as the permitted area) with the test image selected by the patch selecting part 242, and determines where or not this test image can be printed on a single sheet of recording paper 32. The color calibration control part 240, if it determines that the test image cannot be printed on a single sheet of recording paper 32, will shift to the processing of S220 or, if it determines that printing on a single sheet of recording paper 32 is possible, will shift to the processing of S222.

At step 220 (S220), the color calibration control part 240 converts the image data of the test image selected by the patch selecting part 242 into image data of the test image compressed in size to be accommodable in the permitted area of the recording paper 32.

At step 222 (S222), the color calibration control part 240 applies, as mode defining information on this calibration job, the mode defining information on the operating mode in the usual job immediately before, adds to it paper designating information on the selected type of recording paper, and supplies the combined information to the data acquiring part 200.

The data acquiring part 200 generates a calibration job by use of the mode defining information and paper designating information entered from the color calibration control part 240 and the image data of the test image selected by the patch selecting part 242 (including the compressed test image).

At step 224 (S224), the color calibration control part 240 adds, to the generated calibration job, information to the effect that a paper carriage sequence matching the length in the carrying direction of the recording paper to be used for printing the test image is to be applied.

At step 226 (S226), the data acquiring part 200 specifies mode defining information including the number of sheets to be printed, the distinction between color and monochrome, the resolution of output, and the type of recording paper on the basis of the entered print request data and the image data of the requested image, and generates a usual job according to these items of mode defining information (the switch-over of the operating mode and the number of sheets to be printed).

At step 228 (S228), the data acquiring part 200 supplies the generated usual job or calibration job sequentially to the image correcting part 220 and the operating mode setting part 210 as the job to be executed.

At step 229 (S229), the data acquiring part 200 determines whether or not all the jobs to be generated in compliance with the print request data have been supplied. The data acquiring part 200, if it finds that all have been supplied, ends the job generation processing (S210) or, if not, returns to the processing of S212 to continue job (usual job or calibration job) generation.

As hitherto described, the printer device 10 in this embodiment, when it is printing the requested image consecutively, prints a test image by use of a type of recording paper that can be carried in the operating mode of this print processing. The printer device 10 is thereby able to cause print processing of the test image to interrupt the ongoing print processing without altering the operating mode.

Also this printer device 10, by printing the test image on smaller recording paper than what is used in the print processing of the requested image, can slow down the carrying speed of the recording paper on which the test image is printed without having to alter the operating mode of the paper sheet trays 17. The printer device 10 is thereby enabled to read, even when a test image made up of small calibration patterns is to be printed, the test image at the predetermined accuracy.

Next will be described examples of modification of the foregoing embodiments of the present invention.

One of the conceivable examples of modification of the second embodiment is a form in which the printer device 10 prints a test image matching the colors to be used in an ensuing job. That is, the printer device 10 alters the combination of calibration patterns contained in the test image according the combination of colors to be used in the job to be executed after the color calibration processing (hereinafter referred to as the ensuing job). As this enables the printer device 10 to reduce the variety of calibration patterns to be printed to the necessary minimum, the size of the test image (i.e. the size of recording paper) can be made small. Also, the printer device 10 can enlarge the calibration patterns contained in this test image without having to altering the size of the test image.

FIG. 12 shows an example of test image printed according to the combination of colors to be used in the ensuing job.

As shown in FIG. 12, each of calibration patterns 326a through 326d matches the share of its color in the mixture of toners. The printer device 10 in this modification specifies the share of each toner (i.e. the color) in the mixture to be used in the ensuing job on the basis of the image data (the requested image) of the ensuing job, and prints a test image containing only the calibration pattern, out of the calibration patterns 326a through 326d, matching the specified share in the mixture. More specifically, the color calibration control part 240 (data supplying section) analyzes the image data of the ensuing job, reads out of the test image memory part 250 a test image matching the combination of colors to be used in the ensuing job, and supplies it to the data acquiring part 200

Incidentally, the printer device 10 may as well determine a color to be subjected to prioritized color calibration on the basis of the color distribution in the requested image to be printed in the ensuing job, and print a calibration pattern 326 of thus prioritized color on a prioritized basis.

This enables the printer device 10 to print a test image made up of the necessary minimum calibration pattern 326.

Further, as an example of modification of the first embodiment, the printer device 10 may alter the carrying direction of the recording paper 32 according to the printable area of the test image (the permitted area).

Figure 13A:
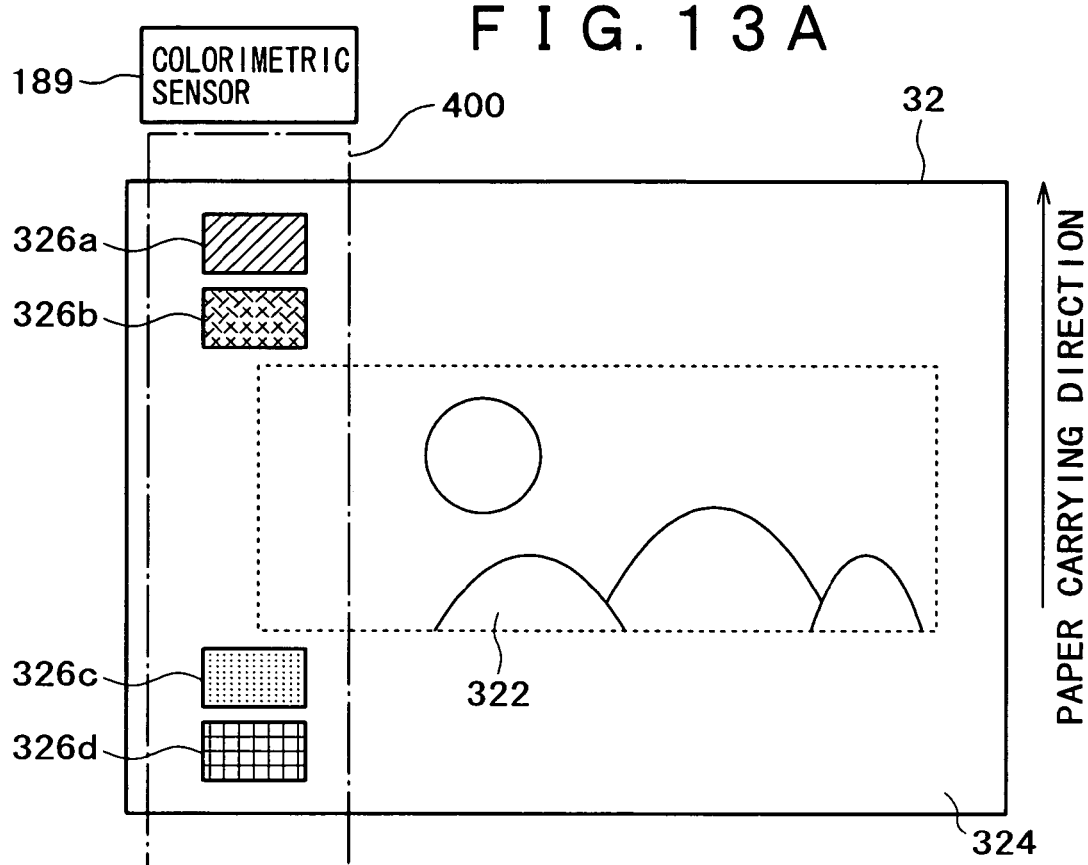
FIG. 13 illustrate how the area where a test image can be printed varies according to the carrying direction of the recording paper 32, FIG. 13A showing the recording paper 32 before its carrying direction is altered, and FIG. 13B, the recording paper 32 after its carrying direction is altered.
Figure 13B:
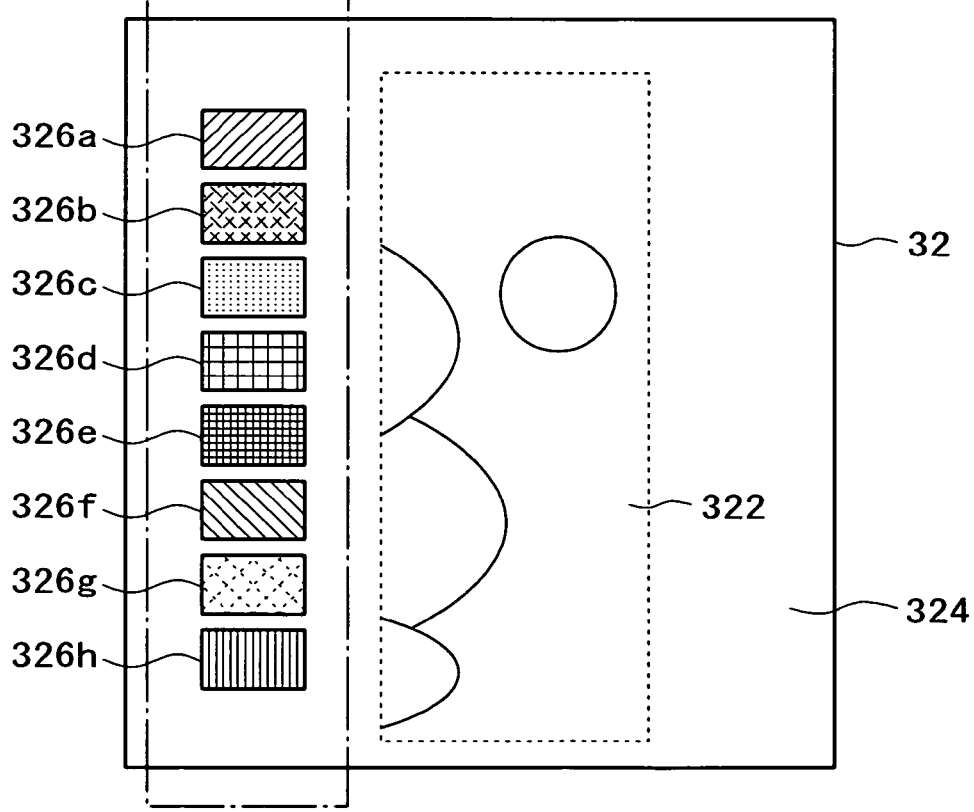

FIG. 13 illustrate how the area where a test image can be printed varies according to the carrying direction of the recording paper 32, FIG. 13A showing the recording paper 32 before its carrying direction is altered, and FIG. 13B, the recording paper 32 after its carrying direction is altered.

As shown in FIG. 13A, where rectangular recording paper 32 is to be carried over the paper sheet carrying path 18 (in particular the discharge path 187) in the direction of the short sides of the sheet, the detectable area 400 is determined on the basis of the short side length of this recording paper 32 and the reading width of the calorimetric sensor 189.

On the other hand, as shown in, FIG. 13B, where rectangular recording paper 32 is to be carried over the paper sheet carrying path 18 (in particular the discharge path 187) in the direction of the long sides of the sheet, the detectable area 400 is determined on the basis of the long side length of this recording paper 32 and the reading width of the colorimetric sensor 189. Therefore, the printer device 10, where rectangular recording paper 32 is to be used printing a test image, may carry this recording paper 32 in the direction of the long sides.

Further, as shown in FIG. 13A, printing of the requested image in the detectable area 400 may sometimes result in a shrinkage in the area where printing of the test image is permissible. Therefore, it is desirable for the printer device 10 to compare the extent of superposition of the area where the requested image is printed with the detectable area 400 between a case in which carriage takes place in the direction of the long sides and a case in which carriage takes place in the direction of the short sides, and determine the carrying direction of the recording paper 32 on that basis.

The printer device 10 is thereby enabled to print the test image in the largest possible detectable area 400 and to enhance the reading accuracy of the test image.

Further in a form wherein a post-processing device (not shown) is connected to the printer device 10, the calorimetric sensor 189 may be disposed on the post-processing device. In this case, the printer device 10 may alter the size of the test image according to the speed at which the recording paper 32 is carried within the post-processing device.

Incidentally, although a case in which color calibration processing is performed on the basis of the test image printed on the recording paper 32 was described as a specific example of the foregoing embodiment, this is not the only conceivable configuration, and the printer device 10 may as well read a the test image (toner image) former of toners of plural colors in the photosensitive drums 152 or the intermediate transfer belt 160 and perform color calibration processing on the basis of the read toner image.

As described above, an image forming device according to an aspect of the invention may have a color calibration pattern generating unit that generates a color calibration pattern, an altering unit that alters a form of the color calibration pattern, generated by the color calibration pattern generating unit, according to the area in which it is to be formed, and a visualizing unit that visualizes the color calibration pattern altered by the altering unit.

The visualizing unit may include an image forming unit that forms an image on a recording medium, and the color calibration pattern generating unit may generate a color calibration pattern in a form matching an area in the recording medium where formation of a color calibration pattern is permitted.

The image forming unit may form the color calibration pattern and an input image entered at a request of a user on the recording medium, and the color calibration pattern generating unit may generate a color calibration pattern that can be formed somewhere in the recording medium other than an area where the input image is to be formed.

The visualizing unit may include an image forming unit that forms an image on a recording medium, the altering unit may split the color calibration pattern according to an area in the recording medium where formation of the color calibration pattern is permitted, and the image forming unit may form the color calibration pattern split by the altering unit on plural recording media.

The image forming device may further have a detector that reads the color calibration pattern formed on the recording medium and detects characteristic quantities of the read color calibration pattern, and a calibration unit that performs color calibration processing on the basis of the characteristic quantities detected by the detector, wherein the color calibration pattern generating unit generates the color calibration pattern in an area on the recording medium where the formation of the color calibration pattern is permitted and the area is readable by the detector.

Also, an image forming device according to an aspect of the invention may have a medium supplying unit that supplies one out of plural types of recording media, an image forming unit that forms, on the recording medium supplied by the medium supplying unit, an image in an operating mode according to the type of the recording medium, and a controller that selects a recording medium for color calibration use out of the plural types of recording media according to an operating mode of image formation processing requested by a user and causes it to be supplied to the image forming unit.

The controller may select, as the recording medium for color calibration use, a recording medium on which the image forming unit can form an image in the operating mode of image formation processing requested by the user.

Also, an image forming device according to an aspect of the invention may have an image forming unit that forms an image on a recording medium, a carrying unit that carries the recording medium on which the image is formed by the image forming unit, a controller that slows down the carriage of recording medium by the carrying unit where the image forming unit forms a color calibration pattern on a recording medium shorter in length in a carrying direction than a predetermined size compared with a case where the image is formed on a recording medium of the predetermined size, and a detector that reads the color calibration pattern from the recording medium being carried by the carrying unit.

The image forming unit may cause processing to form the color calibration pattern to interrupt while image formation processing requested by a user is being executed, and the controller, where the color calibration pattern is to be formed on a recording medium shorter in length in the carrying direction than the recording medium for use in the image formation processing requested by the user, causes the recording medium on which the color calibration pattern is formed to be carried at a slower carrying speed than the recording medium on which the image is formed by image formation processing requested by the user.

Also, an image forming device according to an aspect of the invention may have a medium supplying unit that supplies one recording medium out of plural types of recording media, an image forming unit that forms an image on the recording medium supplied by the medium supplying unit, and a controller that causes, when a color calibration pattern is formed by the image forming unit, the medium supplying unit to supply the largest recording medium out of the plural types of recording media.

Also, an image forming device according to the invention may have a data supplying unit that supplies at least image data of a color calibration pattern, an image forming unit that forms an image on a recording medium on the basis of the image data supplied by the data supplying unit, a calibration unit that performs color calibration processing on the basis of a color calibration pattern formed on the recording medium, and a controller that varies, according to colors to be used in image formation processing in which a result of the color calibration processing is reflected, the image data of the color calibration pattern supplied by the data supplying unit.

The controller may cause the image forming unit to supply the image data of a color calibration pattern including the colors to be used in the image formation processing after the result of the color calibration processing is reflected.

Also, an image forming device according to the invention may have an image forming unit that forms at least a color calibration pattern on a recording medium at a preset processing speed, a controller that varies, according to the processing speed, the color calibration pattern formed by the image forming unit, and a detector that reads the color calibration pattern formed by the image forming unit.

The image forming unit may form at least an image at a first processing speed or a second processing speed faster than the first processing speed, and the controller, when the color calibration pattern is formed at the second processing speed, may cause a color calibration pattern to be formed which is larger than the color calibration pattern formed at the first processing speed.

The image forming device may further have a carrying unit that carries, at a carrying speed according to the processing speed, a recording medium on which the image has been formed by the image forming unit, wherein the detector reads a color calibration pattern from the recording medium carried by the carrying unit.

Also, an image forming device according to an aspect of the invention may have an image forming unit that forms at least a color calibration pattern on a recording medium, a carrying path that carries the recording medium on which an image is formed by the image forming unit, a detector, disposed on the carrying path, that detects the characteristic quantities of the color calibration pattern formed on the recording medium, and a controller that alters, according to the speed of the recording medium carried on a carrying path, the color calibration pattern formed by the image forming unit.

The image forming unit may form on a recording medium a toner image of plural colors and cause the toner image so formed to be fixed on the recording medium, and the detector may detect characteristic quantities of the image having undergone fixing processing.

Next will be described a pattern formation method according to the invention is a pattern formation method to cause an image forming device to form a color calibration pattern, whereby a color calibration pattern in a form according to an area where it is to be formed is generated, and the color calibration pattern so generated is visualized.

Also, a pattern formation method according to an aspect of the invention may be a pattern formation method to cause an image forming device to form a color calibration pattern, whereby a color calibration pattern is generated, a form of the color calibration pattern so generated is altered according to an area where it is to be formed, and the color calibration pattern so altered is visualized.

Next will be described a storage medium storing a program according to the invention for use by an image forming device containing a computer causes the computer of the image forming device to execute a function for generating a color calibration pattern, the function including the steps of generating a color calibration pattern in a form according to an area where it is to be formed and visualizing the color calibration pattern so generated.

Also, a storage medium storing a program according to an aspect of the invention for use by an image forming device containing a computer may cause the computer of the image forming device to execute a function for generating a color calibration pattern, the function including the steps of generating a color calibration pattern, altering a form of the color calibration pattern so generated according to an area where it is to be formed, and visualizing the color calibration pattern so altered.

The image forming device, the image forming method and the storage medium storing a program for image forming according to the aspects of the invention can achieve satisfactory color calibration.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2003-402637 filed on Dec. 2, 2003 including specification, claims, drawings and abstract is incorporated herein by reference in its entirety.

What is claimed is:

1. An image forming device comprising:
    a color calibration pattern generating unit that generates a color calibration pattern;
    an altering unit that alters a form of the color calibration pattern, generated by the color calibration pattern generating unit, according to the area where it is to be formed; and
    a visualizing unit that visualizes the color calibration pattern altered by the altering unit,
    wherein the visualizing unit comprises an image forming unit that forms an image on a recording medium,
    the altering unit splits the color calibration pattern according to an area in the recording medium where formation of the color calibration pattern is permitted, and the image forming unit forms the color calibration pattern split by the altering unit on a plurality of recording media.

2. The image forming device according to claim 1, further comprising:

a detector that reads the color calibration pattern formed on the recording medium and detects characteristic quantities of the read color calibration pattern; and a calibration unit that performs color calibration processing on the basis of the characteristic quantities detected by the detector, wherein the color calibration pattern generating unit generates the color calibration pattern in an area on the recording medium where the formation of the color calibration pattern is permitted, the area being readable by the detector.

3. The image forming device according to claim 1, wherein the image forming unit forms on a recording medium a toner image of a plurality of colors and causes the toner image formed to be fixed on the recording medium, and a detector detects characteristic quantities of the image having undergone fixing processing.

4. An image forming device comprising:

an image forming unit that forms an image on a recording medium;

a carrying unit that carries the recording medium on which the image is formed by the image forming unit;

a controller that slows down carriage of a recording medium by the carrying unit where the image forming unit forms a color calibration pattern on a recording medium shorter in length in a carrying direction than a predetermined size compared with a case where the image is formed on a recording medium of the predetermined size; and a detector that reads the color calibration pattern from the recording medium being carried by the carrying unit.

5. The image forming device according to claim 4, wherein the image forming unit causes processing to form the color calibration pattern to interrupt while image formation processing requested by a user is being executed, and the controller, where the color calibration pattern is to be formed on a recording medium shorter in length in the carrying direction than the recording medium for use in the image formation processing requested by the user, causes the recording medium on which the color calibration pattern is formed to be carried at a slower carrying speed than the recording medium on which the image is formed by image formation processing requested by the user.

6. An image forming device comprising:

a medium supplying unit that supplies one recording medium out of a plurality of types of recording media;

an image forming unit that forms an image on the recording medium supplied by the medium supplying unit; and a controller that causes, when a color calibration pattern is formed by the image forming unit, the medium supplying unit to supply the largest recording medium out of the plurality of types of recording media.

7. An image forming device comprising:

an image forming unit that forms at least a color calibration pattern on a recording medium at a preset processing speed;

a controller that varies, according to the processing speed, the color calibration pattern formed by the image forming unit; and a detector that reads the color calibration pattern formed by the image forming unit, wherein the image forming unit forms at least an image at a first processing speed or a second processing speed faster than the first processing speed, and the controller, when the color calibration pattern is formed at the second processing speed, causes a color calibration pattern to be formed, which is larger than the color calibration pattern formed at the first processing speed.

8. An image forming device comprising:

an image forming unit that forms at least a color calibration pattern on a recording medium at a preset processing speed;

a controller that varies, according to the processing speed, the color calibration pattern formed by the image forming unit;

a detector that reads the color calibration pattern formed by the image forming unit; and a carrying unit that carries, at a carrying speed according to the processing speed, a recording medium on which the image has been formed by the image forming unit, wherein the detector reads a color calibration pattern from the recording medium carried by the carrying unit.

* * * * *